United States Patent
Quinn et al.

(10) Patent No.: US 7,783,788 B1
(45) Date of Patent: Aug. 24, 2010

(54) VIRTUAL INPUT/OUTPUT SERVER

(75) Inventors: Robert Quinn, Campbell, CA (US);
Ushasri Sunkara, Dublin, CA (US);
Isam Akkawi, Aptos, CA (US); Scott Arthur Lurndal, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 11/624,573

(22) Filed: Jan. 18, 2007

Related U.S. Application Data

(60) Provisional application No. 60/796,116, filed on Apr. 28, 2006.

(51) Int. Cl.
*G06F 3/00* (2006.01)
*G06F 13/12* (2006.01)
*G06F 13/38* (2006.01)
*G06F 13/00* (2006.01)
*G06F 12/00* (2006.01)
*G06F 9/00* (2006.01)
*G06F 9/24* (2006.01)
*G06F 15/177* (2006.01)
*G06F 1/24* (2006.01)

(52) U.S. Cl. .............. 710/8; 710/10; 710/62; 710/104; 711/170; 713/1; 713/2; 713/100

(58) Field of Classification Search .......... 710/62, 710/8, 10, 104; 711/170; 713/1, 2, 100
See application file for complete search history.

(56) References Cited

U.S. PATENT DOCUMENTS

| | | | | |
|---|---|---|---|---|
| 5,734,865 A | * | 3/1998 | Yu | 709/250 |
| 6,172,981 B1 | * | 1/2001 | Cox et al. | 370/401 |
| 7,240,098 B1 | * | 7/2007 | Mansee | 709/212 |
| 2002/0069369 A1 | * | 6/2002 | Tremain | 713/201 |
| 2003/0130833 A1 | * | 7/2003 | Brownell et al. | 703/23 |
| 2005/0044301 A1 | * | 2/2005 | Vasilevsky et al. | 711/1 |
| 2006/0036941 A1 | * | 2/2006 | Neil | 715/526 |
| 2006/0190552 A1 | * | 8/2006 | Henze et al. | 709/216 |
| 2006/0234733 A1 | * | 10/2006 | Wassifi et al. | 455/466 |
| 2007/0195794 A1 | * | 8/2007 | Fujita et al. | 370/395.53 |

OTHER PUBLICATIONS

Merritt, Rick, "PCI Express Spec Updated", EE Times, http://www.informationweek.com/story/showArticle.jhtml?articleID=164300985, Jun. 7, 2005.

* cited by examiner

*Primary Examiner*—Alford W Kindred
*Assistant Examiner*—Farley J Abad

(57) ABSTRACT

Methods, apparatuses and systems directed to virtualized access to input/output (I/O) subsystems. In one implementation, the present invention allows multiple stand-alone application servers or virtual servers to share one or more I/O subsystems, such as host-bus adapters and network interface cards. In one implementation, I/O access is managed by one or more virtual I/O servers. A virtual I/O server includes a multiplexer, and associated modules, that connect application servers over an I/O switch fabric with one or more HBA and/or NIC drivers. Implementations of the present invention can be configured to consolidate I/O access, allowing multiple servers to share one or more HBAs and NICs; dynamic control over network and storage I/O bandwidth; and provisioning of network and storage I/O access across multiple application servers.

23 Claims, 11 Drawing Sheets

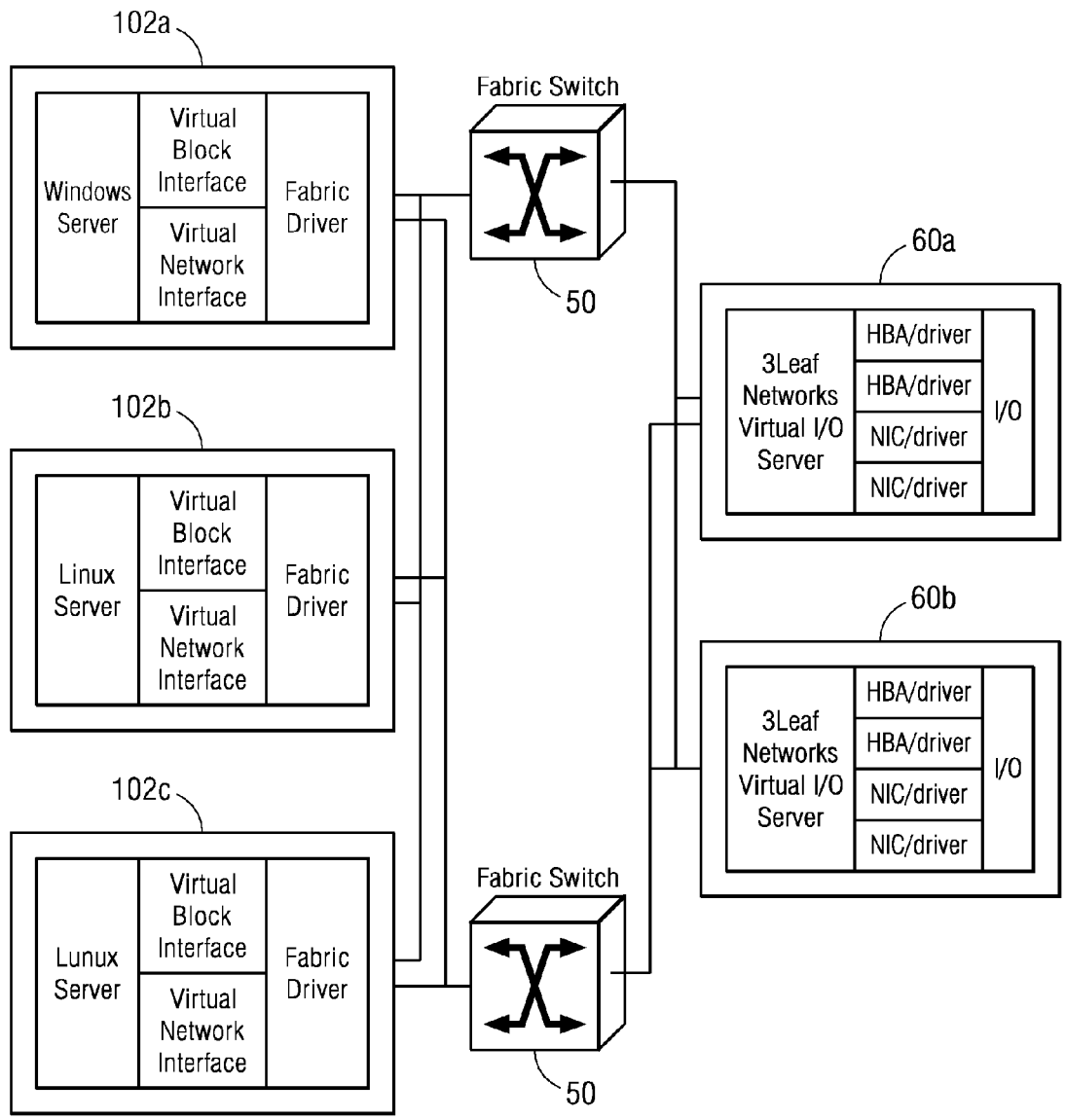
Fig._1

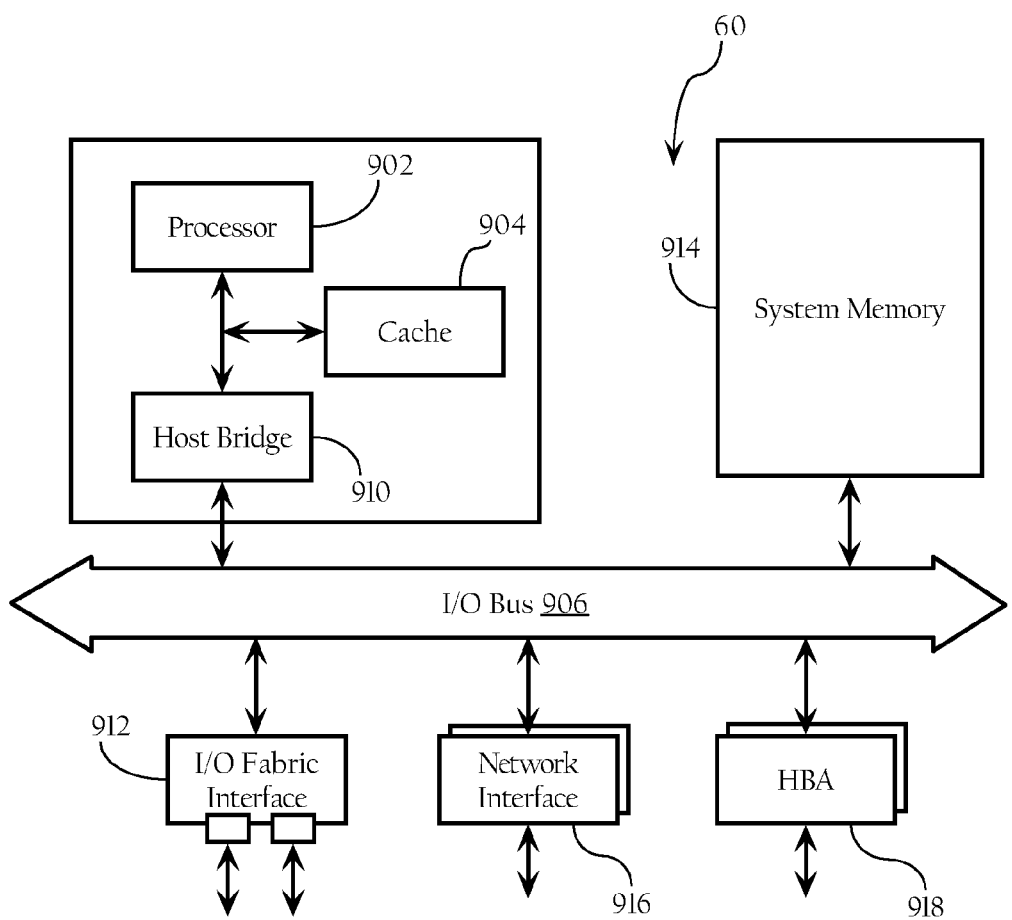
Fig._2

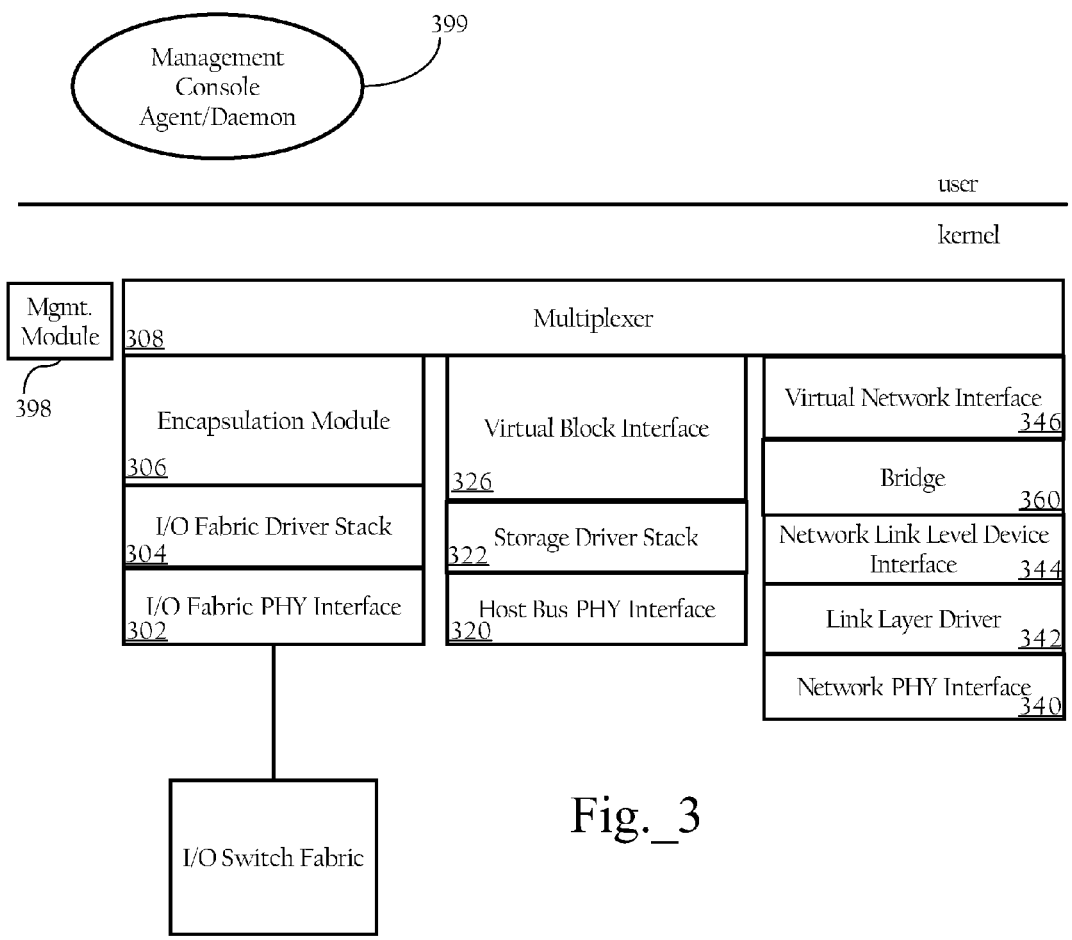
Fig._3

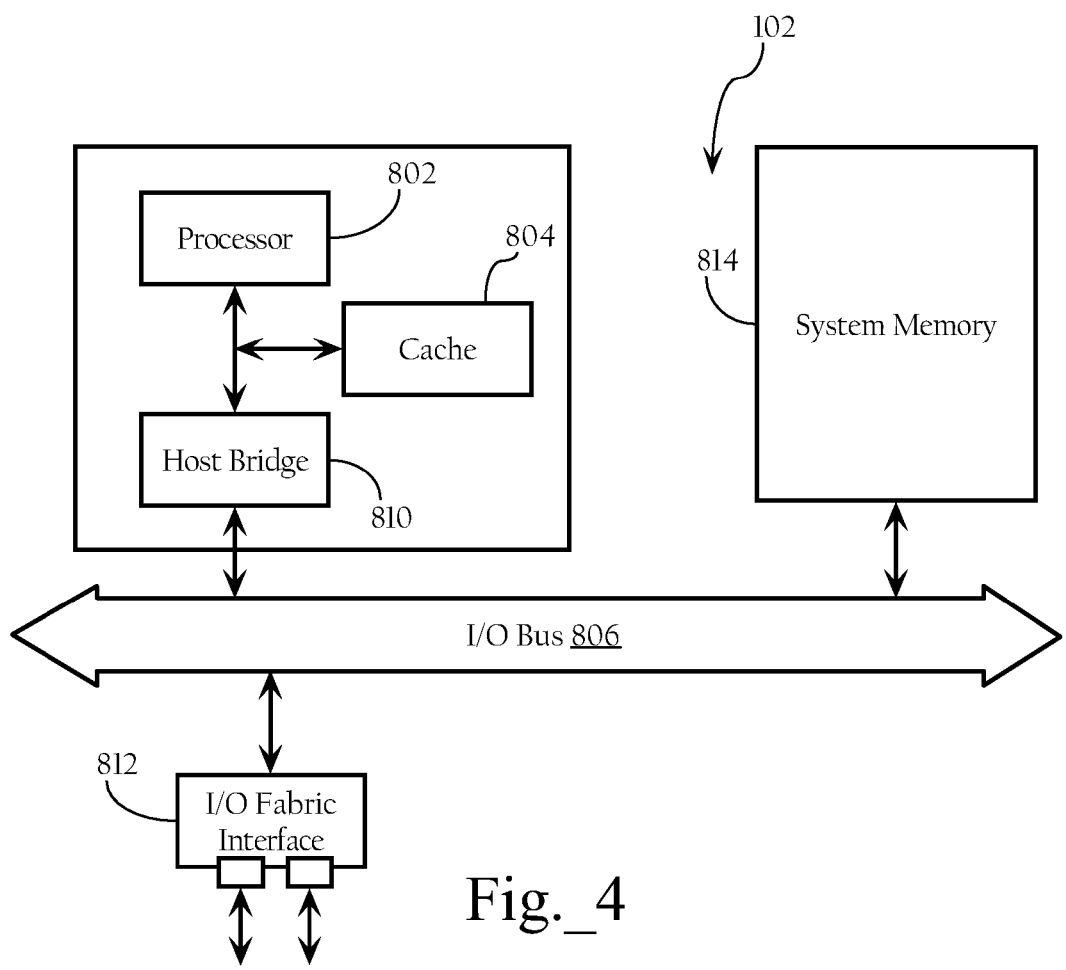
Fig._4

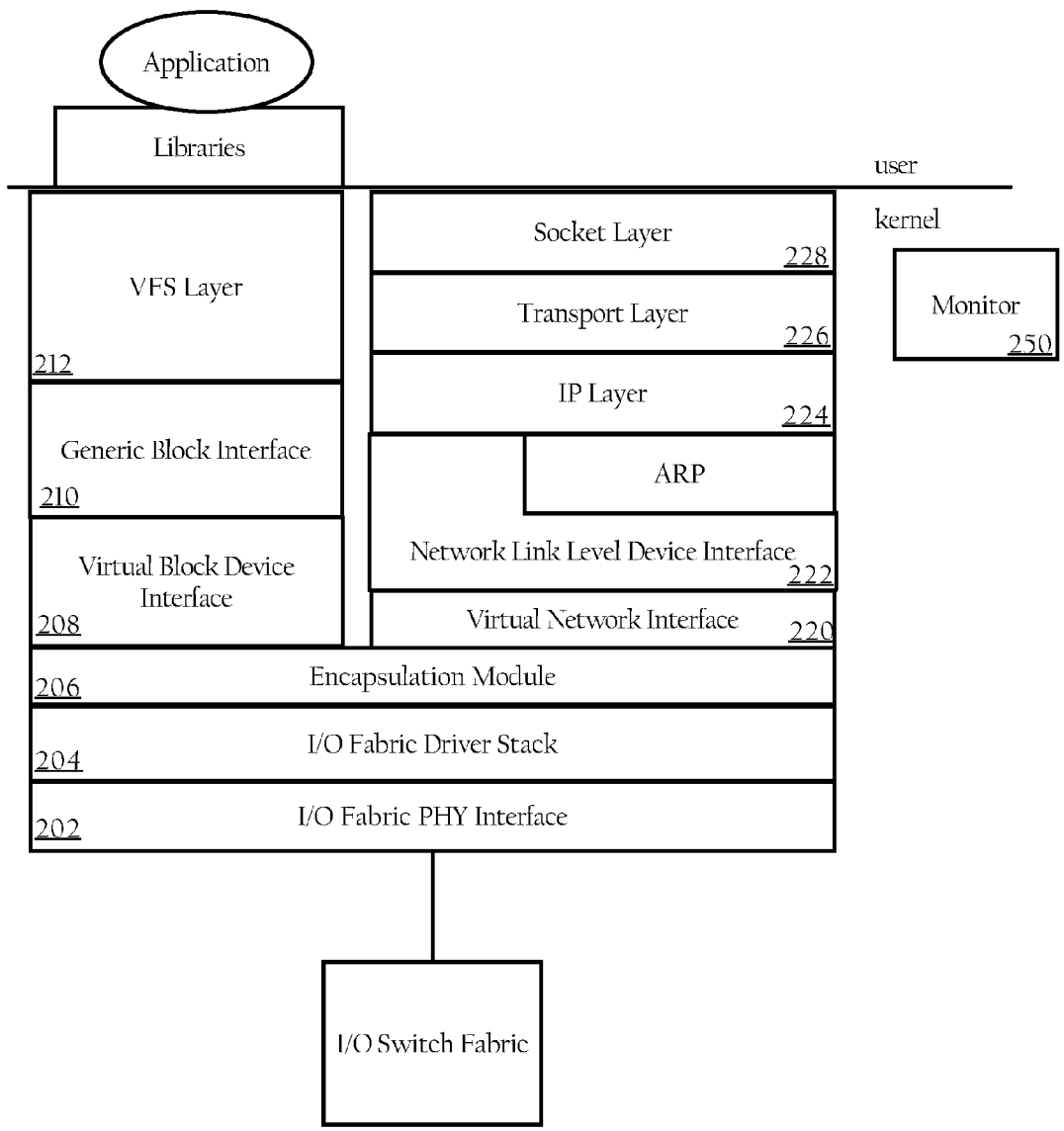
Fig._5

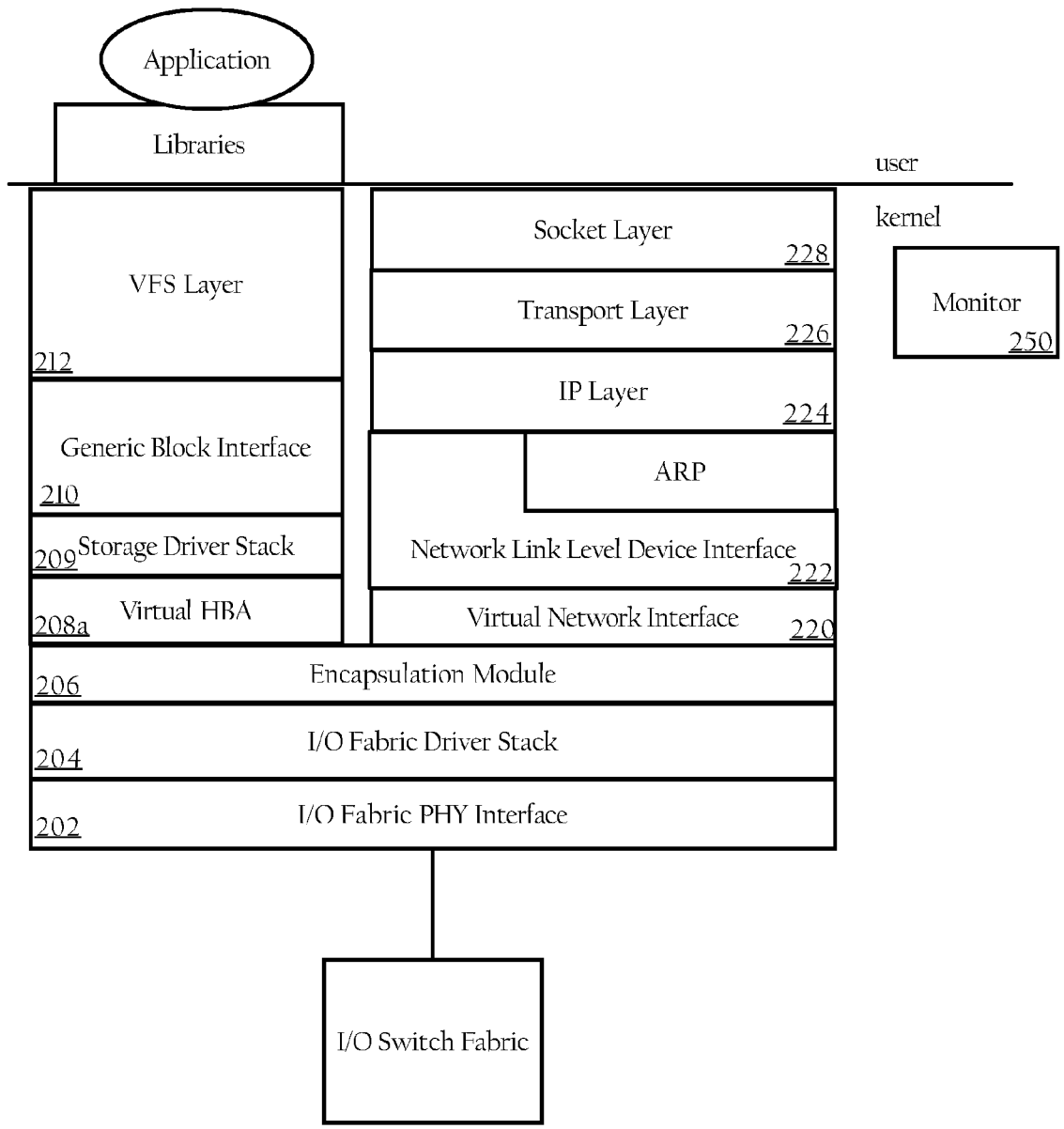
Fig._5A

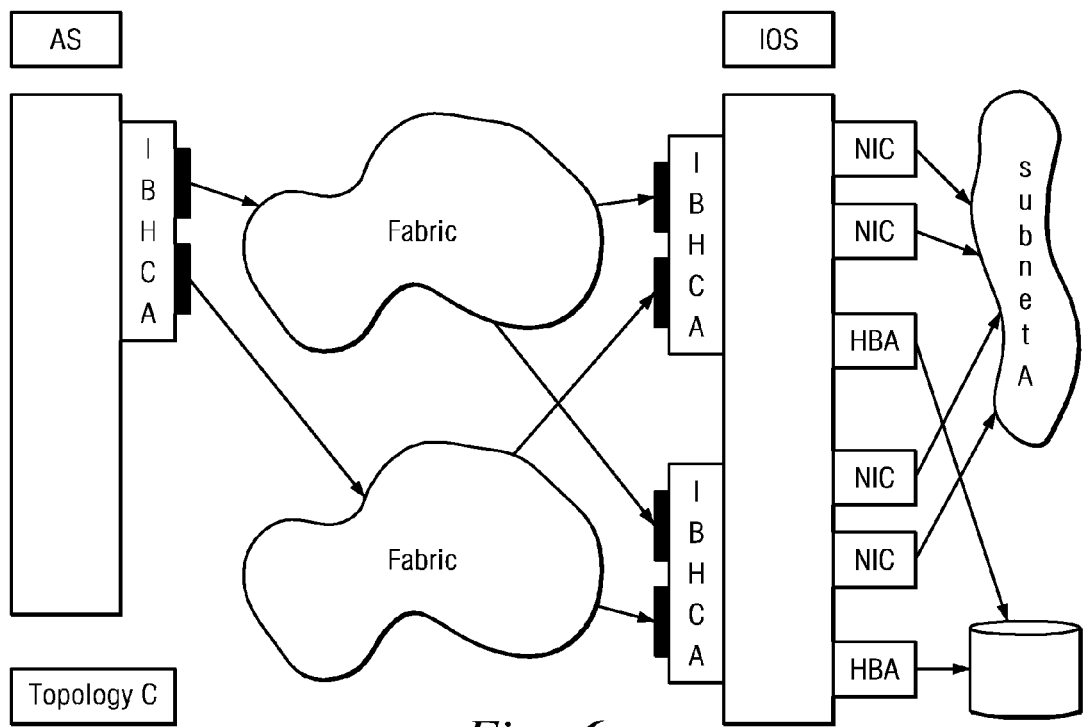
*Fig._6c*
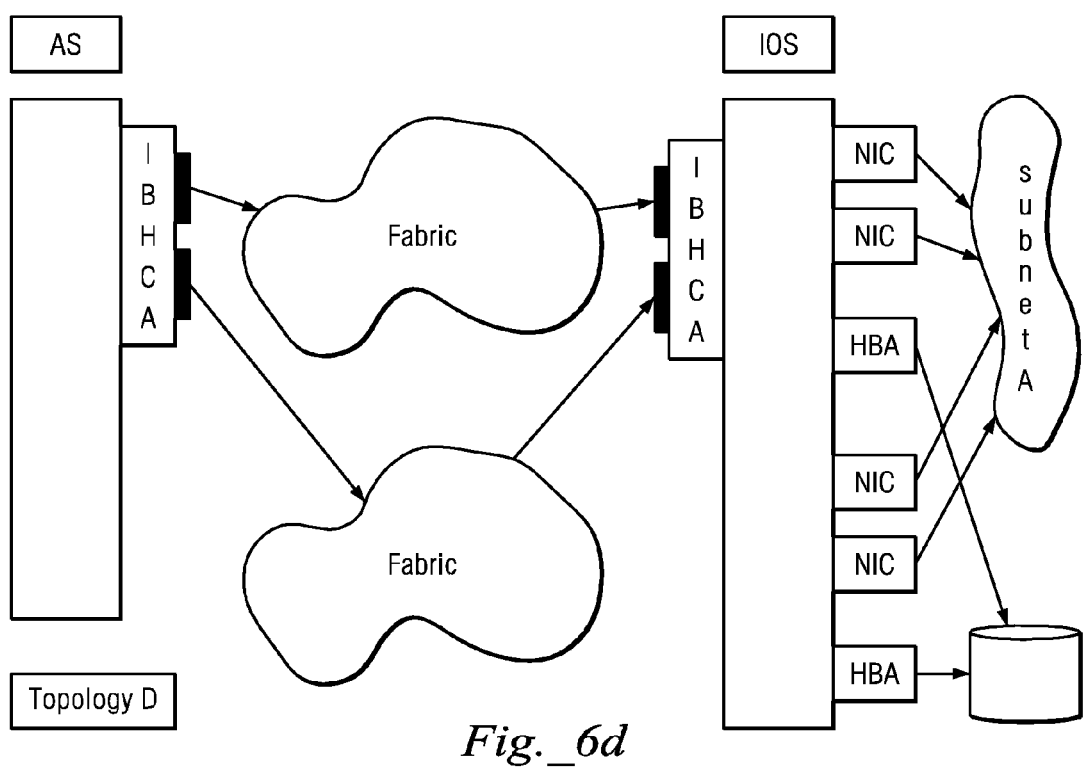
*Fig._6d*

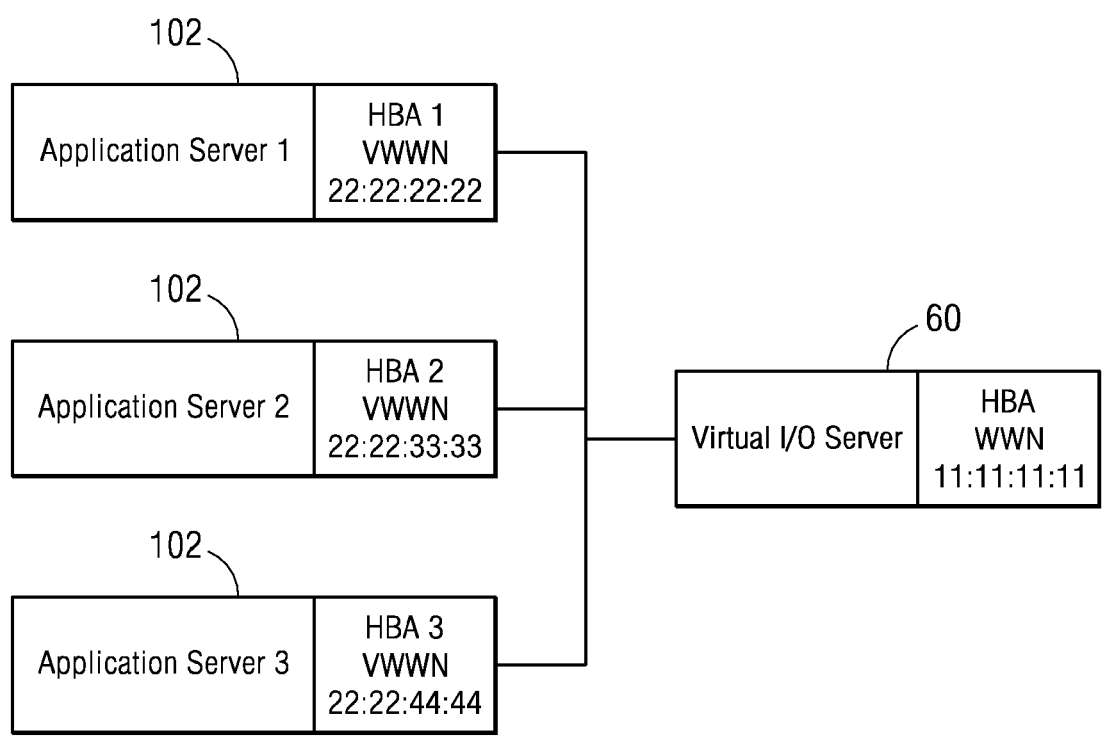
Fig._7

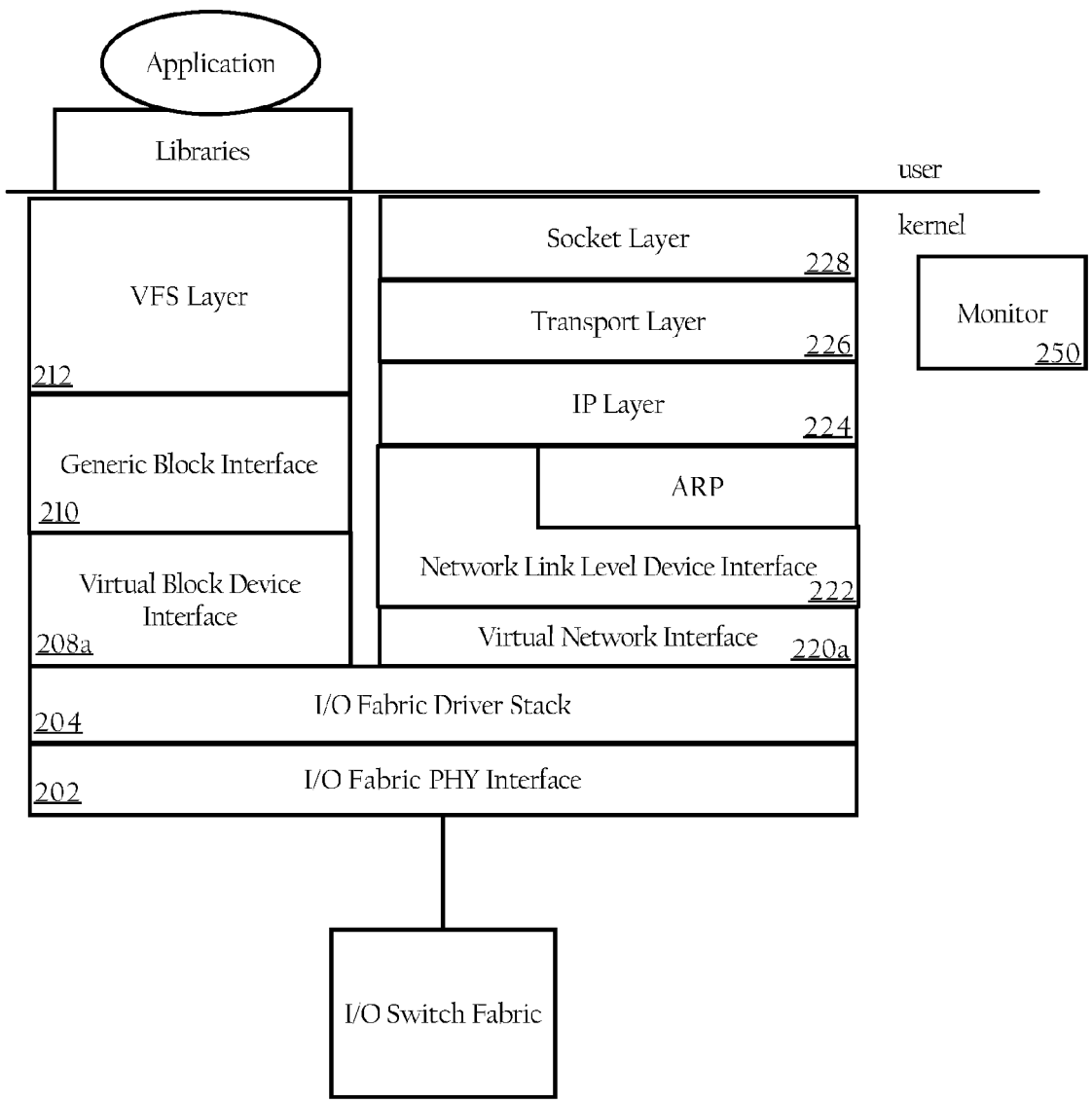
Fig._8B

VIRTUAL INPUT/OUTPUT SERVER

RELATED APPLICATIONS

The present application claims priority to U.S. Provisional Application Ser. No. 60/796,116 filed Apr. 28, 2006.

TECHNICAL FIELD

The present invention relates to computing platforms and, more particularly, to virtualization of input/output (I/O) subsystems that facilitate transparent sharing of I/O subsystems among multiple processing systems.

BACKGROUND

Enterprises have grown increasingly reliant on computing systems to accomplish mission-critical tasks. Indeed, enterprises expend vast amounts of resources dedicated to deploying and supporting servers and other processing systems, as availability of sufficient computing resources is critical to enterprise performance. With increasing complexity and number of applications typically deployed in business environments today, providing sufficient computing resources to meet business needs in a cost effective manner poses many challenges.

The workload on a typical server implementation can vary dramatically throughout the day. In fact, demand for one or more applications, and therefore the processing and I/O resources requirements to effectively support these applications, can shift and vary considerably throughout a typical business day. Many application server implementations usually involve building out the infrastructure either to peak loads or to average loads. Building to peak loads can mean a massive over-commitment of resources. This over-commitment can be fairly large when the management and operational costs of the additional servers is included. Building out the infrastructure to the average load is a common approach for many application implementations, but can have even larger productivity costs when demand spikes. For example, in the case of email application servers, slow email access and error messages are frustrating for users and, at times, can lead to confusing email conversations as messages are delivered out of order. In extreme cases, where disk I/O has become too slow to access the database, the mail application server services can fail, disrupting operations all across the enterprise.

In either type of application server deployment implementation, a server application runs on a host that manages its own local or remote storage, and often network access as well. The size of the host server along with its storage and network capacity bounds the number of users this host can support. In the case of email applications, for example, large installations will break up the email user community into blocks of users that can be managed and hosted on each separate server. For example, email server A might service users with last names beginning with letters A through L, and email server 13 will host users whose last names begin with letters M through Z. Scaling such an architecture up (or down) requires physically adding or removing) hardware resources. This approach, however, is generally time consuming and costly, and fails to address the variation in demand across different applications.

In light of the foregoing, a need in the art exists for more flexible server infrastructures where additional I/O resources can be deployed as needed to support varying requirements. Embodiments of the invention substantially fulfill this need.

SUMMARY

The present invention provides methods, apparatuses and systems directed to virtualized access to input/output (I/O) subsystems. In one implementation, the present invention allows multiple stand-alone application servers or virtual servers to sharer one or more I/O subsystems, such as host-bus adapters and network interfaces. In one implementation, I/O access is managed by one or more virtual I/O servers. A virtual I/O server includes a multiplexer, and associated modules, that connect application servers over an I/O switch fabric with one or more Host Bus Adapter (HBA) and/or Network Interface Controllers (NICs). To an application server, the storage and networking resources available from the virtual I/O server, in one implementation, appear as locally attached physical resources (such as NICs and HBAs) to the operating system of the application server. Implementations of the present invention can be configured to consolidate I/O access, allowing 1) multiple servers to Share one or more HBAs and NICs, 2) dynamic control over network and storage I/O bandwidth, and/or 3) provisioning of network and storage I/O access across multiple application servers.

As will be described below, the Virtual Compute Environment (VCE) is a unique hardware and software virtualization solution that consolidates current data center resources to utilize them more efficiently and cost effectively. With virtualization, a physical computer or server no longer needs to be provisioned as a static resource dedicated to a particular application (or set of applications). Instead, a physical machine can be subdivided into its component parts—processor, memory, storage, and network resources—and these parts can be flexibly arranged by virtualization functionality to create purely logical combinations of resources. In some implementations, the virtualization of I/O access as detailed below allows for enhanced provisioning and control of I/O bandwidth and I/O subsystem access among a plurality of application servers. These and other advantages and features of various embodiments of the invention will become apparent from the following description.

DESCRIPTION OF THE DRAWINGS

FIG. 1 is a functional block diagram illustrating an I/O switch fabric interconnecting application servers and virtual I/O servers.

FIG. 2 is a component diagram showing hardware components of a virtual I/O server according to one implementation of the invention.

FIG. 3 is a schematic diagram illustrating a protocol stack and software modules of a virtual I/O server according to one implementation of the invention.

FIG. 4 is a component diagram showing hardware components of an application server according to one implementation of the invention.

FIG. 5 is a schematic diagram illustrating a protocol stack and software modules of an application server according to one implementation of the invention.

FIG. 5A is a schematic diagram illustrating a protocol stack and software modules of an application server according to an alternative implementation of the invention.

FIGS. 6a, 6b, 6c and 6d are schematic diagrams illustrating various VCE deployment scenarios.

FIG. 7 is a functional block diagram illustrating the assignment of virtual. World Wide Names to application servers according to one implementation of the invention.

FIGS. 8A and 8B illustrate another example I/O subsystem virtualization architecture, according to another implementations of the invention.

DESCRIPTION OF EXEMPLARY EMBODIMENT(S)

Figure 6A:
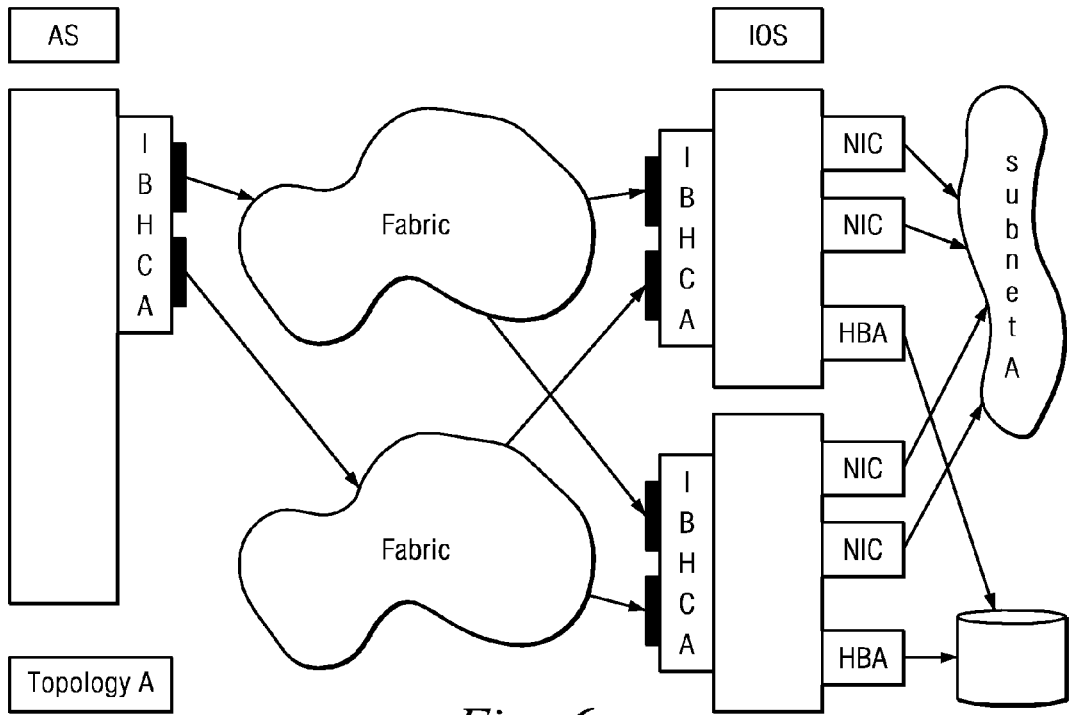

FIG. 1 shows a redundant configuration of two application servers 102 receiving block storage device and network I/O services from two virtual I/O servers 60. Specifically, FIG. 1 illustrates an arrangement of application servers 102a-c (collectively referred to with reference number 102) and virtual I/O servers 60a, 60b (collectively referred to with reference number 60) according to one implementation of the invention. As FIG. 1 illustrates, one or more switches 50 implement an I/O switch fabric interconnecting application servers 102a-c and virtual I/O server 60a, 60b.

The virtual I/O server 60 provides the storage and external networking needs of the application servers 102 connected to the I/O switch fabric, allowing transparent, shared NBA and NIC access through the multiplexing and associated modules of the virtual I/O server. Of course, implementations of the invention can be configured with other I/O subsystems in addition to storage and networking systems. As discussed below, application servers 102 access these devices through virtual device interfaces. The virtual device interfaces operate in connection, with various standard protocol stack modules, intercepting I/O traffic at the device level and forwarding the I/O traffic to the virtual I/O server. The virtual I/O server 60 routes the traffic to the appropriate native interface, such as an HBA or a NIC. In one implementation., the virtual device interfaces are implemented, in the application servers 102, as device drivers of the peripheral class, such as storage and networking peripheral devices. For example, in one implementation, a virtual block device interface of an application server 102 may receive a generic block device command forward it on to a virtual. I/O server 60, which includes a Small Computer Systems Interface (SCSI) or other storage device protocol stack, for processing. The SCSI stack on the virtual. I/O server 60 may translate the command into a SCSI command and transmit it to a storage peripheral device.

Figure 6B:
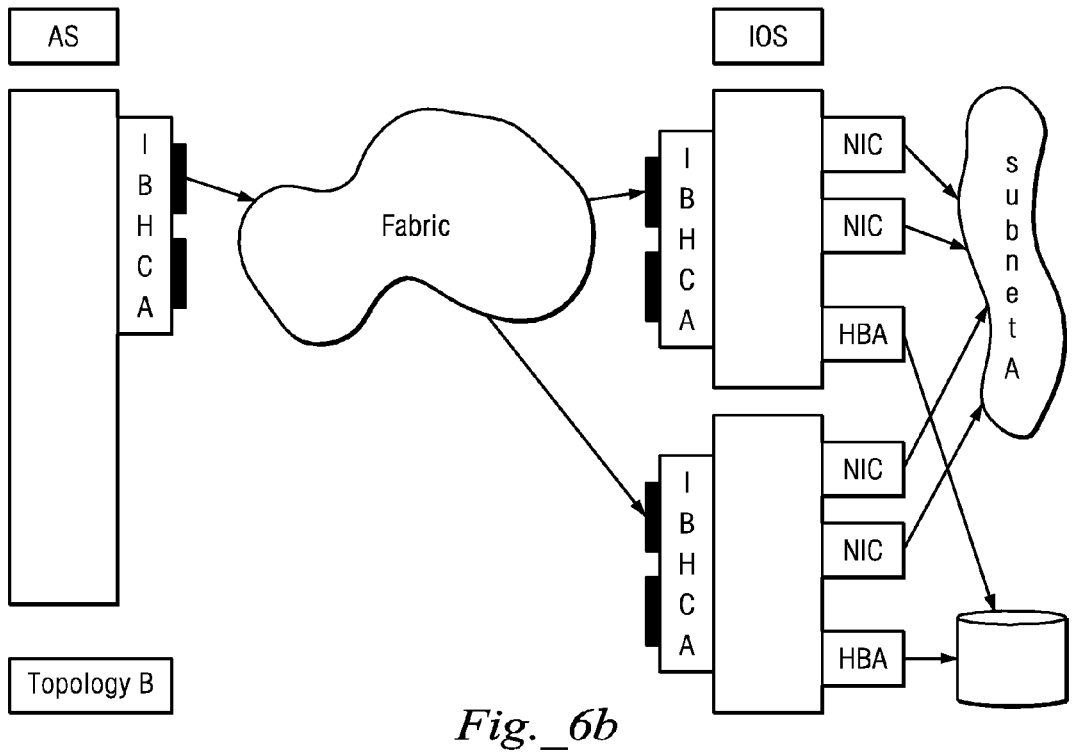

The application server(s) 102 and the virtual I/O server(s) 60 can be deployed in a variety of configurations, as illustrated in FIG. 6a thru 6d. Indeed, various possible topologies exist for connecting the application server(s) 102 to the virtual I/O server(s) 60 across the I/O switch fabric. As described below, some deployments can be configured to provide failover and/or load balancing capabilities. For example, the topologies discussed below include one or more redundant connections, which can be used either in a hot-standby mode or for load-sharing. In one implementation, the topology of FIG. 6a can be configured to provide full redundancy across multiple I/O switch fabrics, using the two ports per I/O switch fabric interface to provide redundant paths to the virtual I/O server 60. This provides failover capabilities when one I/O fabric interface connection or switch fails, and load balancing between I/O switch fabrics when fully operational. With a single virtual I/O server 60 this topology shows it is possible to separate application servers 102 into different fabrics, creating a virtual partition. Each application server 102 that is part of a virtual fabric can make up its own virtual partition, where the number of virtual partitions is equal to the number of application servers 102 in the virtual fabric. In FIG. 6b, the topology employs redundant virtual. I/O servers 60, which have redundant paths to I/O subsystems (subnet and storage), but the paths from the application server 102 to the virtual I/O servers 60 use a single I/O switch fabric. In FIG. 6c, a single virtual I/O server 60, including multiple I/O fabric interfaces, is employed. Lastly, in FIG. 6d, one of the I/O fabric interfaces is removed from the single virtual I/O server 60 of FIG. 6c.

The system can also be configured for multipathing, using multiple interfaces to the fabric, allowing for aggregate bandwidth, failover, and hot swap upgradeability. In one implementation, a 20-port fabric switch 50 can be used. If virtual I/O servers 60 are redundant and they consist of two ports each, 4 ports of the fabric switch 50 is occupied by them. That leaves 16 ports for application servers 102. In one implementation, additional virtual I/O servers 60 can be added to the I/O switch fabric for additional I/O bandwidth.

In one implementation, the switch fabric is a switched fabric interconnect implemented by a combination of interfaces or adapters on the application servers 102 and virtual I/O servers 60, and one or more switches 50. In one implementation, application servers 102 and virtual I/O servers 60 each include host adapters connected to one or more switches 50. In one implementation, the host adapters and switches 50 implement the switched fabric I/O standard disclosed in the Infiniband$^{SM}$ Trade Association (IBTA) specification. In another implementation, the host adapters or interlaces and switches 50 can implement a link layer networking standard, such as the Ethernet standard disclosed in the IEEE 802.3 specification. Of course, other switch fabric protocols can be used to implement the I/O switch fabric between the application servers 102 and virtual I/O servers 60. In one implementation, the I/O traffic (storage and network traffic) between the application servers 102 and the devices connected to the virtual I/O server 60 are encapsulated in the protocols employed by the switch fabric (e.g., Infiniband, Ethernet, etc.). In some implementations, the switch fabric may be a routed fabric.

A virtual I/O server 60 can have locally attached storage accessible through its HBAs, or Storage Area Network (SAN), and Network Attached Storage (NAS) storage. In one implementation, virtual I/O server storage is primarily used for swap, and storage of root file systems for the application server. In one implementation, an application server 102 may boot its kernel, from a Preboot eXecution Environment (PXE) boot server, which could also be the virtual I/O server 60, or whatever system is currently set up in the network. In one implementation, multiple application servers 102 may share the same root partition in which case changes to their respective local configurations are cached or stored on the virtual. I/O server 60, saving disk space and making system set up easier. Accordingly, in some implementations, the application server 102 need not have any spinning media. Rather, the virtual I/O server 60 is accessed though one or more HBA connections for storage requirements. With hooting over fabric, the application server 102 can be reduced to it bare metal node with no or minimal configuration information. By mapping an application server 102 to various boot images on the PXE server or the SAN, an application server's function can be changed with a single reboot.

A. Hardware, Software, and Protocol Component Overview

The following provides an overview of the hardware components and functional modules of a virtual I/O server 60 and an application server 102 according to one possible implementation of the invention.

A.1 Virtual I/O Server Protocol Stack and Hardware Architecture

In particular implementations, two components of the virtual I/O server 60 are multiplexer 308 and encapsulation 306 modules. In one implementation, the multiplexer 308 is a kernel module which transfers incoming requests from the application servers 102 to the appropriate native HBA or NIC driver attached to the virtual I/O server 60. Encapsulation modules tunnel I/O traffic over the I/O switch fabric between virtual device interfaces on the application server 102 and the multiplexer of the virtual I/O server 60. Together, these modules or drivers, in one implementation, are responsible for receiving requests from application servers, setting up and tearing down intermediate I/O buffers, passing the I/O requests to the appropriate real. HBA or NIC driver, processing the response from the HBA and/or NIC driver and returning the results of the request to the initiating application server.

The multiplexer 308 can also be configured to provide Quality of Service (QoS) guarantees to the client application and servers. Available I/O fabric bandwidth, for example, can be apportioned to the client application servers by the multiplexer. A management console interfaces with the multiplexer code to allow dynamic modification of the QoS levels for the clients. Possible QoS schemes include server prioritization, weighted round-robin and a lottery scheduler. In one implementation, possible QoS parameters can be computed based on a percentage of calculated I/O server throughput. Throughput can be calculated based on theoretical bus throughputs adjusted by the appropriate overhead factor, or throughput can be calculated on a running basis based upon peak load capabilities. In addition, each server can be assigned a percentage of the available bandwidth.

FIG. 3 illustrates the protocol stack and modules of a virtual I/O server 60 according to one possible implementation of the invention. I/O fabric PHY interface 302 generally refers to the hardware interface or interconnection to the I/O switch fabric, while I/O fabric driver stack 304 generally refers to one or more drivers directed to the communication of messages across the I/O switch fabric. In one implementation, I/O fabric driver stack 304 comprises an Infiniband host channel adapter (FICA) driver layer and an Infiniband access layer (handling connection management tasks across the I/O switch fabric). Encapsulation module 306 handles encapsulation processes associated with the virtualization of I/O subsystems between one or more application servers 102 and one or more network interfaces 916 and host bus adapters 918 attached to virtual I/O server 60 (see FIG. 2). Multiplexer 308 is operative to direct message or data flow between various components of virtual I/O server 60, as described in more detail below.

Host bus PHY interface 320 generally refers to the physical hardware interface or adapter that interconnects virtual I/O server 60 to a mass storage system or storage network system. Virtual I/O server 60 further includes storage driver stack 322, which provide the native driver level interfaces to host bus PITY interface 320. Virtual block interface 326 allows for storage system access over the I/O switch fabric. When a request is received by the encapsulation module 306 on the virtual I/O server 60, the request is passed to the multiplexer 303 which routes the request to the virtual block interface 326 which inserts to the device queue. The virtual block interface 326, in one particular implementation, may receive SCSI commands from an application server 102 over the I/O fabric, and make calls into the SCSI layer of storage driver stack 322. In another implementation, virtual block interface 326 receives generic read, write and/or other commands that are translated into the appropriate protocols (e.g., SCSI, Intelligent Peripheral Interface (IPI), Integrated Drive Electronics (IDE), etc.).

Network PHY interface 340 generally refers to the physical hardware that provides a connection to a network (such as a LAN). Link layer driver 342 and network link level device interface 344 provide the software level interfaces to network PITY interface 340. In one implementation, network PITY interface 340, link layer driver 342 and network link level device interface 344 together provide link layer network services according to the IEEE 802.3 (Ethernet) standard. In one implementation, included in these functions are various filter drivers, as well as bridging and link bonding functions. For example, the networking protocol stack includes bridge layer 300, which performs bridging functions relative to the virtual MAC addresses of the application servers 102. In one implementation, the network FEY interface 340 operates in a promiscuous mode accepting all frames and passing them up the protocol stack for a higher-level decision on whether to bridge or reject them. The bridge layer 360 is operative to forward frames received at network PHY interface 340 to virtual network interface layer 346. In one implementation, bridge layer 360 is operative to bridge native Ethernet frames to virtual network interface layer 346, which maps the virtual MAC address in the received. Ethernet frame to the switch fabric identifier (e.g., an HCA GUID or LID) of the application server 102. The bridge layer 360, in one implementation, also handles broadcast and multicast Ethernet traffic by replicating the broad/multi-cast packets to each of the interfaces (virtual or physical) associated with the bridge layer 360. Multiplexer 308 and encapsulation module 306 operate to forward (e.g., tunnel) the Ethernet frame to the virtual network interface 220 of application server 102 over the I/O switch fabric. In addition, virtualization of the link layer interfaces across the I/O switch fabric, in one implementation, is transparent to higher layer network protocol functions, such as DHCP, ARP, TCP and the like.

As FIG. 3 shows, virtual I/O server 60 also includes management console 399 and management module 398. In one implementation, management console 399 is a user space application that supports user interfaces and workflows that facilitate configuration of the Virtual Compute Environment. In one implementation, management console 399 passes configurations entered by operators as configuration events to a management module 398, which in one implementation is a kernel space module. Using the management console 399, an operator, for example, may configure one or more virtual block devices and/or virtual network interfaces for an application server 102. For example, when adding an application server 102 to the VCE, an operator may assign a virtual MAC address, which ultimately is provided to the virtual network interface driver 220 of the desired application server 102. The management console 399 also allows the network administrator to configure virtual World Wide Names for the application servers 102. In one implementation, a typical configuration for an application server 102 includes 1) one or more link, layer network interface profiles (each including a virtual MAC address), and 2) one or more block device configurations. In one implementation, after receipt of a configuration event, management module 398 may provide configuration data to one or more layers or drivers of the virtual I/O server 60. For example, if an operator configures a new virtual MAC address for an application server 102, the management module 398 passes the new virtual. MAC address to the virtual network interface 346 in association with an identifier for the application server 102 (such as the GUID of the HCA of the application server 102). In addition, an operator can configure a virtual WWN for an application server 102, which causes the virtual block interface 326 of virtual. I/O server 60 to expose the virtual. WWN to a storage area network. (See FIG. 7).

In a SAN, an application server generally accesses storage through a Fibre Channel card or HBA of a virtual I/O server 60. During the setup of the application server, the Virtual I/O Server administrator, in one implementation, allocates part or all of a virtual or physical HBA of the virtual I/O server 60 available to a particular application server. The storage devices discovered with each allocated HBA appears on the application server 102 as a block storage device to the operating system. This virtual HBA uses an interface to communicate with the operating system. In one implementation, the virtual block storage device is indistinguishable from a physical one to the operating system of the application server, the Fibre Channel switch, and the SAN. To implement this, each association between an application server and an HBA of the virtual I/O server is assigned a virtual World Wide Name (VWWN), just as a physical. HBA has a World Wide Name (WWN), to provide a unique identifier for the application server to the storage network. The VWWN can be used just like a WWN for normal LUN masking or zoning from either the target device or SAN fabric. The SAN administrator can use the VWWN of the application server to perform the zoning. The VWWN only grants access to assigned devices. Therefore, even though two application servers may be connected to the same physical HBA, their different VWWNs ensure they do not access each other's data and thus maintain compatibility with current SAN security models.

As FIG. 3 illustrates, in one implementation, the modules and layers discussed above are kernel modules operating in kernel space. However, the virtual I/O server 60 may be implemented in connection with operating systems that have no distinction between kernel space and user space. Additionally, seine of the functionality discussed here can be embodied in modules that execute in user-space. Also illustrated in FIG. 3 is a management console 399 that facilitates the configuration of virtual I/O server 60 and/or one or more application servers 102.

FIG. 2 is a functional block diagram showing the hardware components of a virtual I/O server 60 according to one implementation of the invention. In one implementation, virtual I/O server 60 comprises a processor 902, a cache memory 904, an operating system, and one or more software, firmware and/or hardware modules or drivers directed to the functions described herein. Additionally, virtual I/O server 60 includes an input/output (I/O) bus 906 and system memory 914. A host bridge 910 couples processor 902 to I/O bus 906. I/O bus 906 also couples to I/O fabric interface 912, network interface 916 and host bus adapter 918. Virtual I/O server 60 may also include additional components, such as a management console port (e.g., a serial or USB port), mass storage (e.g., hard disk drives), ROM, EEPROMs, etc. Collectively, these elements are intended to represent a broad category of computer hardware systems, including but not limited to general purpose computer systems based on the AMD OPTERON® or INTEL PENTIUM® processor, as well as any other suitable processor. In one implementation, the virtual I/O server 60 includes a dual processor AMD OPTERON® computing system providing a mix of PCI-Express and PCI-X capabilities. The virtual I/O server 60 can also be embodied in other hardware architectures and computing platforms, such as embedded devices and appliances.

In one implementation, I/O fabric interface 912 provides communication between virtual I/O server 60 and the I/O switch fabric. In one implementation, I/O fabric interface 912 is a host channel adapter (HCA) implementing the Infiniband standard (above). Network interface 916 provides communication between virtual I/O server 60 and any of a wide range of networks, such as an Ethernet (e.g., IEEE 802.3, IEEE 802.11, etc.) or token-ring networks, etc. Host bus adapter (HBA) 918 provides an interface to a mass storage device directly, or a storage area network (SAN). A network interface can also be employed to access one or more network attached storage (NAS) systems. Typical host bus adapters can include one or more of IDE, SATA, SCSI, RAID controller, and FiberChannel cards which interface to one or more storage media devices over a storage area network.

Virtual I/O server 60 may include a variety of system architectures, and various components may be rearranged. For example, virtual PO server 60 may include additional processor cores or modules. In addition, cache 904 may be on-chip with processor 902. Alternatively, cache 904 and processor 902 may be packed together as a "processor module," with processor 902 being referred to as the "processor core." Furthermore, in some implementations, not all components couple directly to I/O bus 906. For example, in one implementation, virtual I/O server 60 may include a high performance I/O bus 906 coupled to processor 902 (via host bridge 910) and system memory 914, and a standard I/O bus (not, shown) coupled to I/O fabric interface 912, network interface 916 and host bus adapter 918. In such an implementation, an I/O bus bridge communicably couples the high performance I/O bus 906 and the standard. I/O bus. Furthermore, the hardware system may include additional components, such as additional processors, storage devices, or memory modules.

In one embodiment, the operations of virtual I/O server 60 described herein are implemented as a series of software routines executed by the hardware system described above. These software routines comprise a plurality or series of instructions to be executed by a processor in a hardware system, such as processor 902. Initially, the series of instructions are stored on a storage device, such as a mass storage unit. However, the series of instructions can be stored on any suitable storage medium, such as a diskette, CD-ROM, ROM, EEPROM, etc. One or more functions of the virtual I/O server 60 can also be implemented as firmware or hardware. Furthermore, the series of instructions need not be stored locally, and could be received from a remote storage device, such as a server on a network, via network/communication interface 916 or I/O fabric interface 912. The instructions are copied into memory 914 and then accessed and executed by processor 902. An operating system manages and controls the operation of virtual I/O server 60. The operating system provides an interface between the functional modules and the hardware components of the system. According to one embodiment of the present invention, the operating system is the LINUX operating system. However, the present invention may be used with other suitable operating systems, such as the APPLE® MAC® Operating System, available from Apple Computer Inc. of Cupertino, Calif., UNIX® operating systems, the Windows® 95/98/NT/XP operating system, available from Microsoft Corporation of Redmond, Wash., and the like.

Figure 8A:
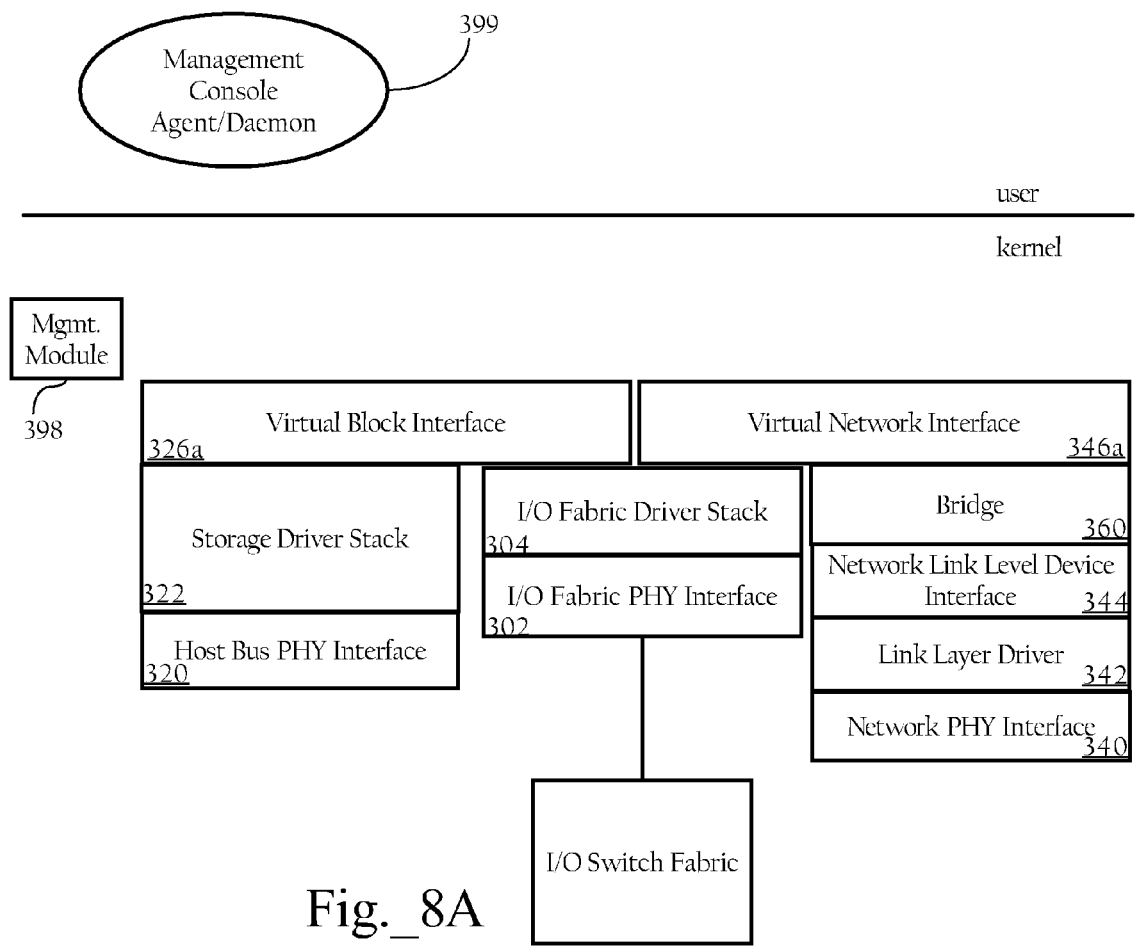

FIGS. 8A and 3B illustrates an alternative implementation of the virtual I/O server 60 and application server 102, respectively. In the implementation illustrates, the virtual I/O server 60 omits multiplexer 308 and encapsulation 306 modules, while application server 102 omits encapsulation module 206. In this particular implementation, the encapsulation functions of module 306 are incorporated into virtual block interface module 326a and virtual network interface 346a of virtual I/O server 60, while the functions of encapsulation module 206 are incorporated into virtual block interface module 208a and virtual network interface 220a of application server 102. In the implementation shown, the corresponding virtual interface of application server 102 and virtual I/O server 60 can communicate directly over the I/O fabric using separate logical fabric connections (such as RC Queue Pairs in implementations using Infiniband as the I/O fabric). Virtual block interface module 346a of virtual I/O server 60 can provide the mapping capabilities between virtual block devices of the application servers 102 and physical block devices.

A.2. Application, Server Protocol Stack and Hardware Architecture

The application server 102 may be implemented with any suitable hardware platform, including a commodity blade platform with a PCI-Express bus. As discussed herein, an interface or adapter, in one implementation, operably connected on a PCI-Express bus is connected to one or more virtual I/O servers 60 through one or more fabric switches. In one implementation, the application server 102 includes a variety of conventional network and storage stack drivers and modules. Inserted into the network and storage protocol stacks are virtual interface drivers configured to intercept block device and network requests, at the device level, and pass them through the I/O fabric interface to a virtual I/O server 60 for processing. The virtual block device driver 208, for example, receives block requests for a given device and passes them to the virtual. I/O server 60 over the I/O switch fabric. Similarly, virtual network interface 220, in one implementation, emulates an Ethernet NIC. In one implementation, this driver plugs in at the bottom of the network stack and provides an Internet Protocol address bridged by the Virtual I/O server 60 onto a LAN.

Virtualization at the device level, in some implementations, achieves one or more advantages. For example, particular implementations of the virtualization scheme described herein allow for use of existing computing infrastructures, including hardware and software, while abstracting the operation of the intermediate I/O switch fabric. Furthermore, in some implementations, the virtual I/O server uses existing device drivers to communicate with I/O subsystems eliminating the need to qualify new hardware or software for interacting with the I/O subsystems. In addition, in some implementations, the operating system kernel need not be modified since the device drivers and other stack modules can be loaded at boot time.

When an application server 102 is booted, it will contact the virtual I/O server 60 over the fabric to obtain the device configuration (including, for example, virtual block devices and virtual network interfaces) from the virtual I/O server 60. The virtual block interface or device driver 208, in one implementation, registers itself as a standard PCI driver (emulating a peripheral class device driver). When the PCI scan code invokes the driver scan entry point to determine if there is any physical PCI hardware managed by this driver, virtual block device driver 208 communicates over the fabric with the I/O processor management software to retrieve the device configuration that should be presented to the operating system hosted on application server 102. In one implementation, it responds to the operating system as if it has claimed a device on the PCI bus, and when invoked by the SCSI stack code, will present the appropriate device configuration. In another implementation; the virtual block device driver 208 registers with the generic block layer 210 when it is loaded. The virtual block device driver 208 will appear to the application server 102 as if it were a block device. The devices, in one implementation, are named using the standard SCSI device naming scheme (similar to the methods used by the Linux IDE-SCSI and USB mass storage class drivers). To support network access, devices, in one particular implementation, are named as virtual interfaces. The interface name, in one implementation, is N, where N is the next available number beginning with zero.

Mapping device names on application servers 102 to the device name used on the virtual I/O server 60 is a cooperative effort between the virtual interface modules of the application server (which presents a set of names from the SCSI device namespace to the operating system) and the in multiplexer 308 of virtual I/O server 60 which maps the incoming requests from the application servers 102 to the appropriate device driver on the virtual I/O server 60.

The following describes various protocol stack components and modules of the application server 102 according to one possible implementation of the invention. FIG. 5 illustrates the protocol stack and modules of an application server 102 according to one possible implementation of the invention. I/O fabric PHY interface 202 generally refers to the hardware interface or interconnection to the I/O switch fabric, while I/O fabric driver stack 204 generally refers to one or more drivers directed to the communication of messages across the I/O switch fabric. In one implementation, fabric driver stack 204 comprises an Infiniband host channel adapter (HCA) driver layer and an Infiniband access layer. In one implementation, the I/O fabric driver stack and I/O fabric PHY interface can employ the reliable RC connections supported by the Infiniband standard. Equivalent protocols can be used for reliable and in-order message delivery across the I/O switch fabric. Furthermore, in one implementation, the I/O fabric PHY interface 202 and associated drivers supports remote direct memory access (RDMA), allowing for read and write operations directly with system memory without involvement of a central processing unit. Still further, other technologies (e.g., PCI express) and protocols (e.g. link layer protocols, such IEEE 802.3 (Ethernet)) across the I/O switch fabric can be used.

Encapsulation module 206 handles encapsulation processes associated with the virtualization of I/O subsystems between the application server 102 and one or more network interfaces 916 and host bus adapters 918 attached to virtual server 60. In one implementation, encapsulation module 206 presents a generic interface to higher layer virtual interfaces, such as virtual block device interface 208. In one implementation, encapsulation module 206 is operative to consume messages from higher layers of the protocol stack, encapsulate messages with a header and transmit messages, using I/O fabric, protocol dependent modules, across the I/O switch fabric to a remote encapsulation module 306 of virtual I/O server 60.

Virtual block device interface 208 presents a virtual block device interface to generic block interface 210. At initialization, the virtual block device interface 208 interacts with virtual I/O server 60 to receive a block, device configuration, and registers as a provider of block storage to the operating system. In one implementation, generic block interface 210 is a native, generic block interface standard to the underlying operating system of application server 102. Virtual file system (VFS) layer 212 provides a generic file system interface to applications and forwards requests to file system-specific code (such as FAT, EXT2, ISO9660 etc). For example, when an application, issues a read system call, the system call may transfer control from user mode into the kernel and invokes the read VFS function. Internal kernel state associated with the open file directs the VFS read function to invoke the file-system specific read function, which will perform mapping operations to map the byte offset in the file to the physical block on the media. It then requests that block from the generic block interface 210 (which invokes the virtual block device interface 208). In one implementation, virtual block device interface 208 is operative to establish a connection with virtual block interface 326 of virtual I/O server 60 to forward commands or other messages. In one implementation, this connection is a persistent, session layer connection utilizing a reliable transport protocol.

Virtual network interface 220 presents a virtual link layer interface to higher layers of the protocol stack. In one implementation, the virtual network interface 220 is used to access network interfaces of the virtual. I/O server 60 over the I/O switch fabric, Using the encapsulation module 206 to provide the interfaces to establish and maintain the connection. In one implementation, the virtual network interface layer 220 is configured with a link, layer network interface profile (including a virtual media access control (MAC) address) that it receives from a virtual I/O server 60. In one implementation, the link layer network interface profile may include other attributes, such as a supported speed or bandwidth, and other NIC attributes that are presented to an operating system. In one implementation, above the virtual network interface 220 in the protocol stack are standard networking protocol implementation layers, such as network link level device interface 222, IP layer 224, transport layer 226 and socket layer 228.

In one implementation, application server 102 also includes a monitor module 250. In one implementation, monitor module 250 is a kernel loadable module that handles various management tasks associated with the VCE. For example, the monitor module 250 is operative to automatically discover nodes (e.g., other application servers 102, virtual I/O servers 60) connected to the I/O switch fabric. In one implementation, the monitor module 250 broadcasts messages, and monitors for messages broadcast by other nodes, such as application servers 102 and virtual I/O servers 60. In one implementation, monitor module 250 is also operative to provide a heartbeat signal or message to one or more virtual I/O servers 60, and to monitor for similar heartbeats from virtual. I/O servers 60. In one implementation, when an application server 102 is initialized, the monitor module 250 automatically discovers one or more virtual I/O servers 60. Other modules of the application server 102 can then contact the discovered virtual I/O server(s) 60 to obtain configuration information. In addition, the heartbeat functionality can be used to allow the application server 102 to failover to an alternate virtual I/O server 60 in the event of fabric failure, I/O server failure, or other problems.

After discovery of one or more virtual I/O servers 60 by the monitor module 250, the virtual block device interface 208 and the virtual network interface 220 of application server 102, in one implementation, are operative to establish unicast connections with the virtual I/O server 60. As discussed herein, the virtual device and network layers initially use the connection to obtain configuration information to present to the operating system of the application server 102. In one implementation, virtual block device interface 208 is operative to maintain a connection with virtual block interface 326 of virtual I/O server 60, while virtual network interface 220 is operative to maintain a connection with virtual network interface 346. In one implementation, the respective connections are persistent, reliable connections involving a handshake protocol to set up the connection. In addition, the respective connections, in one implementation utilize port numbers to identify the connections. For example, the virtual block device interface 208 may transmit an initial handshake message, requesting a type of service and identifying a port, to the virtual I/O server 60. The multiplexer 308, in one implementation, routes the message to the virtual block interface 326 of virtual I/O server 60, which transmits a responsive message. After the initial handshake, other protocols or message flows can be initiated, such as authentication, configuration, and the like. Thereafter, I/O and control/management traffic between the respective modules of the application server 102 and virtual I/O server 60 are transmitted over the connections.

Application server 102 can take a variety of forms. For example, application server 102 may range from a large mainframe system to commodity personal computer system or server system architectures. FIG. 4 illustrates for didactic purposes a hardware system, which may be used to implement an application server 102. In one implementation, application server 102 includes a processor 802, a cache memory 804, and one or more software, firmware and/or hardware modules or drivers directed to the functions described Herein. Additionally, application server 102 includes an input/output (I/O) bus 806 and system memory 814. A host bridge 810 couples processor 802 to I/O bus 806. I/O bus 806 also couples to I/O fabric interface 812 to the switch fabric. Application server 102 may also include additional components, such as a management console port (e.g., a serial or USB port), mass storage (e.g., hard disk drives), ROM, EEPROMs, etc. Collectively, these elements are intended to represent a broad category of computer hardware systems, including but not limited to general purpose computer systems based on the AMD Opteron or Intel Pentium® processor, as well as any other suitable processor. Furthermore, in one implementation, application server 102 is housed in a blade housing suitable for mounting in a rack or other server blade housing.

In one implementation 110 fabric interface 812 provides communication between application server 102 and virtual I/O server 60 over the I/O switch fabric. In one implementation, I/O fabric interface 812 is a host channel adapter (HCA) implementing the Infiniband standard (above). However, I/O fabric interface 812 may be any suitable communications interface, such as an Ethernet (e.g., IEEE 802.3) network interface.

Application server 102 may include a variety of system architectures, and various components may be rearranged. For example, application server 102 may include addition processor cores or modules. In addition, cache 804 may be on-chip with processor 802. Alternatively, cache 804 and processor 802 may be packed together as a "processor module," with processor 802 being referred to as the "processor core." Furthermore, in some implementations, not all components couple directly to I/O bus 806. For example, in one implementation, application server 102 may include a high performance I/O bus 806 coupled to processor 802 (via host bridge 810) and system memory 814, and a standard I/O bus (not shown) coupled to I/O fabric interface 812 and possibly other system components. In such an implementation, an I/O bus bridge communicably couples the high performance I/O bus 806 and the standard I/O bus. Furthermore, application server 102 may include additional components, such as additional processors, storage devices, or memory modules.

In one embodiment, the operations of application server 102 described herein are implemented as a series of software routines executed by the hardware system described above. As FIG. 5 illustrates, application server 102 includes one or more applications executed in user space, as well as the storage and network protocol stacks and drivers discussed herein. These software routines comprise a plurality or series of instructions to be executed by a processor in a hardware system, such as processor 802. Initially, the series of instructions are stored on a storage device, such as a mass storage unit. However, the some or all of the series of instructions are stored remotely from application server 102. The instructions are copied into memory 814 and then accessed and executed by processor 802. An operating system manages and controls the operation of application server 102. The operating system provides an interface between the functional modules and the hardware components of the system. According to one embodiment of the present invention, the operating system is the LINUX operating system. However, the present invention may be used with other suitable operating systems, such as the APPLE® MAC® Operating System, available from Apple Computer Inc. of Cupertino, Calif., UNIX® operating systems, the Windows® 95/98/NT/XP operating system, available from Microsoft Corporation of Redmond, Wash., and the like.

A.3. Multiplexer Driver Functions

In one implementation, the multiplexer 308 of the virtual I/O server 60 includes, or operates in connection with, one or more of the following functions and/or features:

A.3.1. State Machine

The state machine describes transitions from connection open through data receive, to data close. It also handles receive timeout, dropped connection, when requested buffer exceeds maximum MTU, and other I/O switch fabric failure events. Using the finite state machine (FSM) lends itself to correctness of actions associated with events for a given state the connection may be in. New events can be added to manage failover, retransmission management and, packet segmentation per the requirements of the underlying I/O switch fabric. An FSM lends itself to manage actions when application nodes join/disappear, what happens to pending requests when the node or connection is no longer responding, or to simply manage a graceful close. Additionally the FSM can manage control events from the I/O switch fabric framework.

A.3.2. Load Balancing

Load balancing within the context of the multiplexer 308 comprises load balancing of requests across ports within a virtual I/O server 60. In one implementation, there is no queuing of requests or packets. Requests can be moved from the port to the corresponding NIC/HBA as policy requires. Load balancing can also be across multiple NIC's or HBA's. In one implementation, the PCI, NIC or networking stack queues multiple requests.

In one implementation, multiple, redundant paths between remote encapsulation module 206 and multiplexer 308 can be used to distribute packet traffic. These modules can use a simple round-robin approach to distribute packets; however, other distribution or load balancing techniques can be used. Client applications can also benefit from the aggregation of data using multiple/redundant connections into the virtual I/O server 60. Load balancing across multiple NIC's within the virtual I/O server 60 can be implemented for outgoing packets at the connection level. It is also possible to support link aggregation across the NIC's to provide a single logical port with higher bandwidth. This link aggregation is defined in IEEE 802.3ad and LACP (link aggregation control protocol).

A.3.3. Failover

Failover can involve multiple components depending on the type of failure. The virtual I/O server 60 can have multiple NIC cards, and therefore multiple Ethernet ports, if requests are aggregated across them, or if one is unused, a failure will cause the other interface to be switched to automatically, even if the interface needs to be reconfigured. NIC card failures can cause switching to other available NIC cards. Ethernet port failure can be followed with detection and switchover to other available Ethernet ports.

When multiple redundant Fabric links are used from an application server 102 to the virtual. I/O server 60, failure of one of (hose links can result in detection and dynamic reconfiguration of the restricted connections to use the remaining good links. The loss of a link can result in a net loss of aggregate bandwidth. Failure of an I/O fabric switch can cause failover to the other available I/O fabric switches in the same I/O switch fabric. If configured for multipath, the Fibrechannel HBA driver supports failover upon path failure from one HBA to another. In one implementation, all the above failover scenarios results in a notification sent to the management console 399. The operator can then intervene to repair the problem. Device discovery will result in device drivers continuing the aggregation of their requests.

Should the virtual. I/O server 60 itself fail, there will be one or more virtual. I/O servers also servicing requests that will pick up the requests as application servers 102 redirect their I/O traffic. In one implementation, virtual I/O servers 60 use a protocol for pinging each other, such that when responses are not received within a certain time period, a virtual I/O server will notify the Management Console 399 that its peer has failed.

A.3.4. QoS and Bandwidth Control

As discussed above, virtual I/O server 60 allows access to I/O resources to be provisioned with policy-based assignments. Using a reservation or some other algorithm, clients of the virtual I/O server 60 may have service guarantees. A management tool assigns values for different connection types or on a per system basis. In one implementation, each application server 102 can be set with a minimum guarantee of how much of each resource it will access. Likewise each application server 102 can be assigned a maximum limit of how much of a resource that is consumable. In one implementation, QoS guarantees apply to the devices to Application Server pairings. Consider this example:

There is a virtual I/O server with 2 NTC's (NIC1 & NIC2). Application Servers A, B, & C share 1 of the NICs, using multiple IP's, while Application Server D gets all of the other NIC. QoS allows NIC bandwidth to be apportioned between A, B, & C such that A gets 40% of NIC1, B gets 30% of NIC1, C gets 30% of NIC1, and D gets 100% of NIC2. A variety of QoS algorithms can be used to support deterministic allocation and prevent starvation of any Application Server, such as weighted fair queuing, and the like. When network resources need to be redistributed it is possible through the Management Console 399 to redistribute those resources to meet current application demands. For example, an application server 102 can have more network bandwidth allocated to it. As demands on the network increase it will be possible to add fabric switches for additional bandwidth.

A.4. Management Interface

The management console 399 is used to present the state of the system to the user, and to facilitate system configuration. There are three basic types of information the virtual I/O server 60 shares with the management layer. What is presented here is a high level view of the scope. The first is configuration. Local management, installation, configuration of devices for sharing. The second is monitoring and aggregation of information. In one implementation, management console 399 supports interfaces that allow the flow of information from /proc, ifconfig, sar, etc to the monitoring tools. Available information may include aggregate I/O fabric, bandwidth consumed by Application Servers, NIC utilization, HBA usage, errors, and the like. Standard Unix/Linux syslog can be used for logging of events, warnings, and debug information.

The third is event handling and propagation. These are alarms and notifications that aid in troubleshooting problems or preventing their occurrence. The kernel or multiplexing driver 308 can keep statistics, tables, histograms of activity, collected in real-time but reported in response to management library requests. Metrics may be collected which allow for notifications when thresholds are exceeded. Alerts could be fed into the Management Console 399 when a particular NIC is kept at 90% of capacity for over 20% of the time, for example. Another example is the event propagation when a SAN administrator decides to offline some devices on the network, the Management Console may not know that a priori, so when requests from application servers fail, those events lead to notifications. The management tools may allow device mappings to be configured. This will be used to map HCA and NIC devices to the multiplexer 308 of virtual. I/O server 60.

number of processes/activities can be presented to describe the interactions of the management console 399 with the system for purpose of configuring/monitoring the system. Certain scenarios are highlighted here to show the capabilities of the system:

The management interface can be used to define keys and passwords to use for authenticating application servers, or for other security minded activities.

Resource map update. With the management console, an operator can make a change to which nodes have which resources under its control.

Reboot/shutdown the system. Requests to reboot or shutdown can be transmitted from the management console. The management console 399 on the virtual I/O Server has sockets open with a corresponding daemon on each application server. Various command and control messages can be sent, between the processes, reboot/shutdown is used to initiate reboot/shutdown from the virtual I/O Server to the client application servers. When the request is received, they acknowledge the request and perform reboot/shutdown semantics. Reboot/shutdown can also be implemented Out of Band using an Intelligent Platform Management Interface (IPMI).

Authenticate the Application Server. The management console can set up a private and public key on the application server and copy the public key over to the virtual I/O server. When the application server makes its first request over the fabric, the virtual. I/O server sees the unique/new GUID and sends a challenge. The application server responds, if the keys match, further requests are allowed to proceed. The virtual server may be set up to challenge all application servers after some duration, or when the management console instructs it to do so.

Monitor and record I/O usage per application server. This can be broken down per interface type, whether it be HBA's or NIC's.

Monitor and record I/O usage per Fabric for an I/O Server.

Report I/O usage on the Fabric and Ethernet NIC. Information can be recorded such that historical trends can be displayed. The user can be given the ability to define where the data is recorded.

B. Exemplary Configuration, Deployment and Operational Scenarios

B.1. Installation

In one implementation, a first-time installation of the virtual. I/O server 60 involves one or more of the following steps or operations:

1. Installation of a Linux Distribution, or other operating system.
2. Installation of Virtual I/O Driver stack (multiplexer 308, encapsulation module 306, etc.). Install script automatically starts driver.
3. Installation of the Management Console. Operator can now start the Management Console software.
4. Admin defines one or more IP addresses for virtual I/O Server (may have multiple NIC's attached).
5. Admin uses Management Console, and adds known application servers.
6. Admin uses Management Console, lists of available NIC devices and HBA devices are presented. They are represented as device paths (/dev), and are known once the system has booted. Admin uses these lists to map physical devices to application servers, and also defines policy and other attributes.
7. As application servers 102 contact the virtual I/O server 60 (first time when they boot, via the initialization scripts/driver init( ) routine), they will go though an authentication phase whereby they are passed their resource caches. An application server 102 will create virtual device nodes upon successful authentication. In one implementation, these are the devices in /dev and can use the udev facility for the creation of unique device identifiers.
8. An application server 102 performs discovery operations to find a virtual I/O Server. The application server 102, in one implementation, is notified by the monitor 250 when a virtual I/O server 60 is detected on the I/O switch fabric. The application server 102 then transmits a message to the detected virtual I/O server 60 to request a resource map. One or more virtual I/O servers 60 may reply, and resources from each can be sequentially be added.

B.2. Configuration Updates

In one implementation, the management console 399 allows for updates to the resource availability. In one implementation, these updates involve one or more of the following operations:

Using Management Console, admin adds/deletes/modifies resources, which propagate as changes to the resource cache.

Resource cache gets pushed to application servers 102 as modifications are made. Device driver creates new device nodes if needed.

Local administrator will create device node if needed, or just mount the new resource, involving no service disruption on the application servers 102.

B.3. System Startup—Discovery and Authentication

Application servers 102, in one implementation, first use PXE boot to get the kernel operating system loaded on the system. The server providing the kernel image can be the virtual I/O server if configured as such; however, another boot server may be accessed. When not configured in advance by the management console 399, application servers 102 become known as they make respective first requests, usually the request to mount the root file system. Identification of application servers 102 can be accomplished via the HCA GUID, embedded in a packet which encapsulation module 206 forwards to the virtual I/O server 60 for identification purposes. In one implementation, for security purposes however, the request will not be honored until the management console responds. This response may or may not be immediate, depending on whether the HCA GUM is known to the virtual I/O server configuration. If it is not, an event is posted to the Management Console where operator intervention is required to have the application server join with its virtual services.

In the application, server 102, the virtual block device (VBD) and virtual network (VIF) interfaces 208, 220 map to respective HCA and NIC devices of the virtual I/O server, encapsulation module 206 encapsulates requests going to the I/O switch fabric, receives packets from the I/O switch fabric on the way to the VBD/VIF. If authentication has not occurred, encapsulation module 206 does not forward messages onto the I/O switch fabric.

A protocol exists for the application server 102 to get its IP address, device map, LUN's and controller list as it boots from the virtual I/O server. Other elements such as DNS, DHCP startup are transparent in such that the procedure isn't any different than normal system boot. This would be used if the application server 102 has no local disk or swap device.

B.4. Accessing Storage Devices Over I/O Fabric

In one implementation, virtual block device interface 208 and encapsulation module 206 enable application server 102 to transparently access one or more storage systems over the I/O fabric. As discussed above, virtual I/O server 60 includes one or more host bus adapters that are operably connected to directly attached storage devices (e.g., directly attached SCSI devices) or a storage area network. For example, in one implementation, the virtual I/O server 60 is connected via one or more host bus adapters (HBAs) to Fibre Channel switches, which in turn are connected to one or more Fibre Channel storage system(s). The virtual I/O server 60 and the storage device(s) communicate via the Fibre Channel protocol suite, which allows SCSI commands to be transmitted via high-speed serial connections.

In one implementation, whether the virtual I/O server 60 operates in connection with a SAN or directly attached SCSI devices is transparent to the application servers 102. Virtual I/O server 60 identifies directly attached SCSI devices based on the conventional SCSI naming convention, including a tuple of the host bus adapter, a SCSI bus identifier, a target identifier, and a logical unit number (LUN). SANs employ World. Wide Names (WWNs) to identify devices connected to the storage network. For example, a storage device can be identified by a combination of a WWN (which generally corresponds to a SCSI target identifier) and a LUN. SANs may also support a login protocol where initiators and targets obtain a loop identifier, which is the address used to deliver massages across the SAN.

In one implementation, virtual I/O server 60 interacts with the SAN, terminating operation of the SAN protocols and rendering its operation transparent to the application servers 102. The following description of how an application server 102 is configured for storage system access is illustrative. Using management console 399, an operator may assign a virtual WWN to an application, and associate the virtual WWN to a selected host bus adapter of the virtual I/O server 60. The host bus adapter of the virtual I/O server 60, in one implementation, supports N-port virtualization allowing it to present multiple virtual WWNs to the SAN. The configuration event causes the host bus adapter to present the virtual WWN of the application server 102 on the SAN. The virtual. I/O server 60 also performs a log-in to the SAN on behalf of the SAN network to obtain a loop identifier. In addition, the virtual I/O server 60 performs SAN discovery to find one or more available storage devices available to the application server 102 on the SAN. As discussed herein, the virtual. I/O server 60 presents the discovered storage device(s) to the application server 102 as virtual block devices.

Either with directly attached SCSI devices or devices discovered across the SAN, the kernel of the virtual I/O server 60 creates a node in its device name space, associating the node entry with the SCSI or SAN identifier. In one implementation, the virtual I/O server 60 also associates a persistent device identifier, such as the serial number or other vital product data, with the node entry. In implementations involving Linux, the virtual I/O server 60 provides to the application server 102 a name for the storage device(s) in the /dev name space. In one implementation, after discovery is completed for an application server, the virtual I/O server 60 stores identifiers in its local /dev name space for the discovered storage devices, where the identifiers are unique to the application server. In other words, even if the physical storage devices discovered for a given application server are the same for other application servers, virtual I/O server 60 creates device names that are unique across all application servers 102 and virtual WWNs. Accordingly, the virtual I/O server 60 maps the unique device name to the actual identifier used across the SAN or directly attached SCSI bus. In one implementation, the device name(s) provided to the application server can follow the following convention: vbX, where X begins with "a" and increments alphabetically. In one implementation, udev rules can be configured to map these arbitrary identifiers to persistent identifiers. With the block device name(s), the application server 102 may mount a file system or use one or more block devices for raw storage.

In one implementation, when an application executed by application server 102 issues a read system call, for example. The system call transfers control from user mode into the kernel and invokes the read VFS function. As discussed above, internal kernel state associated with the open file will direct the VFS read function to invoke a file-system specific read function, which will perform mapping operations to map the byte offset in the file to the physical block on the media. The VFS layer 212 then requests that block from the generic block interface 210, which invokes the virtual block device interface 208.

The virtual block device interface 208 intercepts the request from the generic block interface 210 and passes it to the encapsulation module 206. In one implementation, the virtual block device request may include one or more of the following a target device identifier, a block number, a data location, a length (e.g., number of bytes), and a read/write indication. The encapsulation module 206 encapsulates the virtual block device request with a virtual I/O header and transmits the encapsulated request in a message across the I/O fabric to the virtual I/O server 60, using the I/O fabric driver stack 204 and the I/O fabric PHY interface 202. In one implementation, the virtual. I/O header includes a protocol field that identifies either the virtual block interface or a virtual network interface (which allows multiplexer 308 of virtual I/O server 60 to route the message to the appropriate protocol stack and interface for processing).

The virtual I/O server 60 receives the message at I/O fabric PHY interface 302. The I/O fabric driver stack 304 strips I/O fabric headers from the received message and passes it to encapsulation module 306. Encapsulation module 306 processes the virtual I/O header to identify the message type (block v. network interface), allowing the multiplexer 308 to route the message to the appropriate protocol stack for processing. For block device commands, the multiplexer forwards the message to virtual block interface 326, which, based on a tuple of the application server identifier and the named target storage device in the request, maps it to the physical storage device identifier on the SAN or SCSI bus, and forwards the request to the host device drivers (in one implementation, storage driver stack 322). In one implementation, the host device drivers (including a SCSI protocol stack) create a SCSI command block and transmit the command to the identified device. In one implementation, the multiplexer 308 ultimately forwards the reply received from the identified target device, performing the device name mapping in reverse, and forwards the reply message(s) to the corresponding encapsulation module 206 of the application server 102. The reply message can be a status indication of a successful write command, or the buffer requested on a read command. The command may also be an asynchronous I/O operation.

As discussed, host systems access remote storage through the I/O switch fabric. The protocol developed to allow this access is, in one implementation, largely based upon the infiniband RDMA Protocol. User level processes typically access storage devices through a file system. Linux and Windows supports a number of these. The range supported is made possible through a unified interface known as the Virtual File System (VFS). The VFS interface provides a clearly defined interface between the kernel and the different file systems. VFS maintains internal structures, performs actions, and forwards tasks to the appropriate file system driver. The central demand made of a file system is the structuring of data to allow high performance and randomized access. A dynamic buffer cache is used to increase the performance of block devices accessed through the file system. In addition to storage accesses through a file system, a process may also access a raw or character storage device directly, bypassing the file system.

An application will perform all file I/O operations, operating on a device that it thinks is a block device, which has registered a file_operations( ) table to fulfill that requirement. In one implementation, virtual block device driver 208 receives the commands and addresses requested from the application, and uses its interfaces with encapsulation module 206 to communicate over the I/O switch fabric to forward the request to the virtual I/O server 60. The virtual block device driver 208 does not interface with the I/O fabric (RCA) devices directly, but uses encapsulation module interfaces to the access methods provided by the I/O switch fabric to maintain connections, which allow the request and responses to propagate between it and the multiplexer 308 of the virtual I/O server 60. Encapsulation module 206, in one implementation, is responsible for connection management and transport of the requests. As discussed above, requests are of the form: device number, block number, number of bytes, and type (read/write). This quadruple will be paired with the connection information for the I/O switch fabric to uniquely identify it.

If the upper SCSI layers are traversed, then the request may be of the form of a SCSI command. For example, FIG. 5A illustrates an alternative system architecture for an application server. In the implementation shown, the storage protocol stack of application server 102 includes a storage driver stack 209 and a virtual host bus adapter (HBA) module 208*a*. The storage driver stack 209 includes class drivers and a SCSI command layer. The virtual HBA module 208*a* emulates a physical host bus adapter. In one implementation, the virtual host bus adapter 208*a* emulates one or more SCSI commands, including read, write, inquiry and mode sense. In this implementation, SCSI commands (as opposed to block requests) are encapsulated and transmitted across the I/O switch fabric to the virtual I/O server. In one implementation, the management console 399 allows an operator to configure the layer or level (block v. HBA) at which the virtualization occurs in the application server 102.

B.4. Network Access Over I/O Fabric

As discussed above, the application server 102 includes virtual network interface layer (VIF) 220 which emulates to higher layers a normal access layer in a networking stack. As with storage system access, below the virtual network interface layer 220 is the encapsulation module 206, Which encapsulates network traffic for transmission across the I/O switch fabric. In one implementation, encapsulation module 206 defines the set of interfaces to access the Fabric Access Layer and is responsible for the connection management and transport over the switch fabric. Encapsulation module 206 interacts with multiplexer 308 on the virtual. I/O server to transmit the I/O traffic for appropriate processing.

When an application executed on an application server 102 formulates a request or other message for transmission, it typically writes the request to socket layer 228. The request is passed to transport layer 226 which performs various actions such as connection handshakes with the destination device, assembly of the data in the request into one or more transport layer packets. In one implementation, the virtual network interface layer 220 emulates a link layer interface and includes a virtual Medium Access Control (MAC) address. In one implementation, the virtual. MAC address is assigned through management console 399. Accordingly, one or more frames including a link layer (e.g., Ethernet header) is passed to virtual network interface 220. Encapsulation module 206 adds a virtual I/O header to the frame and invokes the I/O fabric interface to transmit the packet to the virtual I/O server 60. Accordingly, the message is further encapsulated with one or more I/O fabric headers for transmission from I/O fabric PHY interface 202 of application to the virtual. I/O server 60. Multiplexer 308 receives the encapsulated Ethernet frame and forwards it to virtual network interface 346. The frame is eventually bridged onto the subnet through network PHY interface 340. Responsive messages received at network PHY interface 340 are forwarded back to application server 102 in a similar manner.

As discussed above, in one implementation, the network interface and associated protocol drivers include bridging and spanning tree protocol functionality, treating virtual MAC addresses of the application servers in the same manner as regular MAC addresses. In one implementation, the network interfaces of virtual I/O server 60 run in promiscuous mode so that received packets are passed tip the protocol stack for processing to determine whether they are destined for an application server 102. In one implementation, when a virtual MAC address is created, the management console 399 adds the virtual MAC address to the bridge layer 360. Bridge layer 360, in one implementation, operates similar to a switch which learns MAC addresses associated with the bridge ports by monitoring network traffic.

Network access by an application server 102 is similar to storage access by an application server 102, as described above. A physical NIC is assigned by the Virtual I/O Server to an application server 102. The NIC appears as a virtual. NIC (VNIC) to the operating system running on that application server. Just as a physical NIC contains a MAC address, the VNIC contains an assigned virtual MAC address. This virtual MAC address is a unique identifier that allows the VNIC to provide all the functionality associated with a physical network device. The VNIC exposes itself as a fully functional layer 2 device to the operating system of the application server 102. In one implementation, all operating system level functionality is supported, including thinking and teaming. Still further, two or more NICs of virtual I/O server can be bonded using suitable link bonding protocols, such as Link Aggregation Control Protocol (LACK etc. Furthermore, in most implementations, there is not a one-to-one mapping between virtual and physical NICs; rather, a single physical. NIC can, provide network connectivity to multiple virtual NICs for one to multiple application servers.

Lastly, the present invention has been described with reference to specific embodiments. For example, although the embodiments discussed above are configured to virtualize and manage network and storage I/O access, the present invention can be applied to other I/O access types, such as video systems, printing systems, and other peripheral devices. Still further, the breakdown of the functionality described herein into various modules or layers can be changed. For example, the functionality of an encapsulation module can be incorporated into a virtual device interface, such as a virtual block interface or virtual network interface. Other embodiments of the present invention will be apparent to one of ordinary skill in the art. It is, therefore, intended that the scope of the invention not be limited to the embodiments described above.

What is claimed is:

1. An apparatus, comprising
a memory;
one or more processors;
an input/output (I/O) fabric interface;
an I/O subsystem physical interface;
I/O subsystem device protocol stack logic operative to control data transfer with one or more peripheral systems over the I/O subsystem physical interface; and
virtualization logic encoded in one or more tangible media for execution and when executed operable to cause the one or more processors to:
establish one or more persistent control connections to virtual I/O peripheral subsystem interface driver modules of one or more application servers;
transmit I/O peripheral subsystem configurations to the one or more application servers over the respective one or more persistent control connections;
emulate, relative to the one or more peripheral systems, the one or more application servers;
intermediate I/O subsystem traffic between the one or more application servers and the one or more peripheral systems; and
control utilization of resources of the I/O subsystem physical interface by the one or more application servers according to a configured allocation of resources for the I/O subsystem physical interface across the one or more application servers.

2. The apparatus of claim 1 wherein the virtualization logic is further operable to
receive a I/O subsystem message from an application server on the I/O fabric interface;
forward the I/O subsystem message to the I/O subsystem protocol stack logic for processing.

3. The apparatus of claim 1 wherein the logic is further operable to
receive a responsive message from a peripheral system;
forward the responsive message to a destination application server.

4. The apparatus of claim 1 further comprising encapsulation logic operable to cause the one or more processors to:
receive, from the one or more application servers, I/O subsystem messages with encapsulating headers;
remove the encapsulating headers from the I/O subsystem messages; and
add encapsulating headers to responsive messages received from the one or more peripheral systems.

5. The apparatus of claim 1 further comprising a second I/O subsystem device protocol stack logic operative to control data transfer with one or more peripheral systems over the I/O subsystem physical interface; and
multiplexing logic operable to cause the one or more processors to:
receive I/O subsystem messages from the one or more application servers;
forward the I/O subsystem messages to a select one of the I/O subsystem device protocol stacks based on an identified I/O subsystem message type.

6. The apparatus of claim 1 wherein I/O subsystem device protocol stack logic implements a network protocol.

7. The apparatus of claim 1 wherein I/O subsystem device protocol stack logic implements a mass storage protocol.

8. An apparatus, comprising
a memory;
one or more processors;
an input/output (I/O) fabric interface;
a network physical interface operative to transmit frames to, and receive frames from, one or more remote nodes over a network;
a network protocol stack operative to control the network physical interface, wherein the network protocol stack comprises a virtual network interface layer, a bridge module, and a link layer network interface layer; and
a multiplexer module operative to control utilization of resources of the network interface associated with one or more application servers according to a configured allocation of resources for the network physical interface across the one or more application servers;
wherein the bridge module is operative to forward frames received at the network physical interface to the virtual interface layer;
wherein the virtual interface layer is operative to transmit the frames to the one or more application servers over the I/O fabric interface; and
wherein the virtual interface layer is further operative to
establish one or more persistent control connections to virtual network interface driver modules of the one or more application servers;
transmit network interface profile configurations to the one or more application servers for configuration of the virtual network interface driver modules of the one or more application servers over the respective one or more persistent control connections.

9. The apparatus of claim 8 wherein the link layer network interface layer operates in a promiscuous mode operative to forward received frames to the bridge module.

10. The apparatus of claim 8 wherein the virtual network interface layer is operative to map virtual link layer addresses in frames received over the network interface to respective I/O fabric addresses of corresponding application servers.

11. The apparatus of claim 8 further comprising encapsulation logic operable to cause the one or more processors to:
receive, from the one or more application servers, frames with encapsulating virtualization headers over the I/O fabric interface;
remove the encapsulating virtualization headers from the frames; and
add encapsulating virtualization headers to frames received on network interface.

12. The apparatus of claim 8 further comprising a management console operative to assign virtual link layer network addresses to the one or more application servers.

13. An apparatus, comprising
a memory;
one or more processors;
an input/output (I/O) fabric interface;
a storage system physical interface;
storage driver protocol stack logic operative to control data transfer with one or more data storage systems over the storage system physical interface; and virtualization logic encoded in one or more tangible media for execution and when executed operable to cause the one or more processors to:

establish, over the I/O fabric interface, one or more persistent control connections to a virtual block interface of one or more application servers;

transmit block level storage device configurations to the one or more application servers over the respective one or more persistent control connections;

emulate, relative to the one or more data storage systems, the one or more application servers;

intermediate storage traffic between the one or more application servers and the one or more data storage systems; and control utilization of resources of the storage system physical interface by the one or more application servers according to a configured allocation of resources for the storage system interface across the one or more application servers.

14. The apparatus of claim 13 wherein the virtualization logic comprises a virtual block interface operative to receive block commands from one or more application servers; and, responsive to the block commands, make calls into the storage driver protocol stack for execution of the block commands.

15. The apparatus of claim 13 further comprising encapsulation logic operable to cause the one or more processors to:

receive, from the one or more application servers, block device messages with encapsulating virtualization headers over the I/O fabric interface;

remove the encapsulating virtualization headers from the block device messages; and add encapsulating virtualization headers to block devices received on storage system physical interface.

16. The apparatus of claim 13 wherein the storage system interface is a host bus adapter.

17. The apparatus of claim 13 wherein the storage driver protocol stack logic implements a SCSI protocol.

18. The apparatus of claim 13 wherein the virtualization logic is operative to expose one or more virtual identifiers to the one or more data storage systems.

19. The apparatus of claim 18 wherein the virtual identifiers are world wide names (WWNs).

20. The apparatus of claim 13 wherein the virtualization logic is operative to map device names used by the one or more application servers to device names used by the virtualization logic.

21. A system, comprising
one or more application servers, each of the one or more application servers comprising
a memory;
one or more processors;
a first input/output (I/O) fabric interface; and
computer program code stored in a storage medium, wherein the computer program code comprises
an operating system; and
an I/O communications protocol stack comprising a virtual I/O subsystem interface driver module, comprising computer-readable instructions operative, when executed, to cause the one or more processors:

establish persistent control connections to one or more virtual I/O servers to receive I/O subsystem interface configuration information;

register with the operating system as a device driver to present a virtual device configured according to the configuration information;

emulate, at a device level, an I/O subsystem interface, including one or more storage devices, to the operating system; and intercept messages passed to the I/O subsystem interface and forward the intercepted messages over the connection to a virtual I/O server; and the one or more virtual input/output (I/O) server(s) comprising:
a memory;
one or more processors;
a second I/O fabric interface;
an I/O subsystem physical interface;
I/O subsystem device protocol stack logic operative to control data transfer with one or more peripheral systems over the I/O subsystem physical interface; and
virtualization logic encoded in one or more tangible media for execution and when executed operable to cause the one or more processors to:

establish one or more persistent control connections to a virtual I/O peripheral subsystem interface of the one or more application servers to transmit I/O subsystem interface configuration information;

emulate, relative to the one or more peripheral systems, the one or more application servers;

intermediate I/O subsystem traffic between the one or more application servers and the one or more peripheral systems; and control utilization of resources of the I/O subsystem physical interface by the one or more application servers according to a configured allocation of resources for the I/O subsystem physical interface across the one or more application servers.

22. The system of claim 21 further comprising a first network fabric operative to communicably couple the one or more application servers and the one or more virtual I/O servers.

23. The system of claim 22 further comprising a second, redundant network fabric operative to communicably couple the one or more application servers and the one or more virtual I/O servers.

* * * * *